US011248944B2

(12) United States Patent
Haddy et al.

(10) Patent No.: US 11,248,944 B2
(45) Date of Patent: Feb. 15, 2022

(54) TELEMETRIC FITTING AND METHOD OF TELEMETRIC MEASUREMENT

(71) Applicant: SILICON CONTROLS PTY LTD., MacQuarie Park (AU)

(72) Inventors: John Richard Haddy, Lane Cove West (AU); Michael Alexander St. Leger Neuman, Milsons Point (AU)

(73) Assignee: Silicon Controls Pty Ltd.

( * ) Notice: Subject to any disclaimer, the term of this patent is extended or adjusted under 35 U.S.C. 154(b) by 799 days.

(21) Appl. No.: 15/953,689

(22) Filed: Apr. 16, 2018

(65) Prior Publication Data

US 2018/0238729 A1    Aug. 23, 2018

Related U.S. Application Data

(63) Continuation-in-part of application No. PCT/AU2017/051151, filed on Oct. 21, 2017.

(30) Foreign Application Priority Data

Oct. 21, 2016   (AU) ................................ 2016904289

(51) Int. Cl.
| | |
|---|---|
| *G01F 23/00* | (2006.01) |
| *G01F 23/30* | (2006.01) |
| *G01F 23/38* | (2006.01) |
| *G01F 23/62* | (2006.01) |
| *H04Q 9/00* | (2006.01) |
| *G01F 23/72* | (2006.01) |

(52) U.S. Cl.
CPC .......... *G01F 23/0007* (2013.01); *G01F 23/00* (2013.01); *G01F 23/30* (2013.01); *G01F 23/38* (2013.01); *G01F 23/62* (2013.01); *G01F 23/72* (2013.01); *H04Q 9/00* (2013.01); *G01F 23/0069* (2013.01); *H04Q 2209/40* (2013.01); *H04Q 2209/886* (2013.01)

(58) Field of Classification Search
CPC ...... G01F 23/0007; G01F 23/00; G01F 23/30; G01F 23/38; G01F 23/62; G01F 23/72; G01F 23/0069; H04Q 9/00; H04Q 2209/40; H04Q 2209/886
See application file for complete search history.

(56) References Cited

U.S. PATENT DOCUMENTS

| | | | | |
|---|---|---|---|---|
| 943,868 | A * | 12/1909 | Garlick .................. | G01F 23/34 |
| | | | | 73/317 |
| 1,020,785 | A * | 3/1912 | Warden .................. | G01F 23/34 |
| | | | | 73/317 |
| 2,584,446 | A * | 2/1952 | Hastings ................ | G01F 23/34 |
| | | | | 73/317 |

(Continued)

FOREIGN PATENT DOCUMENTS

| | | | | |
|---|---|---|---|---|
| EP | 1691178 | | 8/2006 | |
| EP | 1691178 A1 * | | 8/2006 | ......... G01F 23/0069 |

*Primary Examiner* — Nimeshkumar D Patel
*Assistant Examiner* — Tania Courson
(74) *Attorney, Agent, or Firm* — Rita C. Chipperson, Esq.; Chipperson Law Group, P.C.

(57) ABSTRACT

Disclosed herein is a telemetric fitting for a liquid-level gauge, the telemetric fitting configured to derive liquid-level information from the liquid-level gauge when attached thereto, and to wirelessly transmit at radio frequencies the liquid-level information.

19 Claims, 15 Drawing Sheets

(56) References Cited

U.S. PATENT DOCUMENTS

| | | | | |
|---|---|---|---|---|
| 2,992,560 A * | 7/1961 | Morgan | ............... | G01F 23/34 73/317 |
| 3,198,010 A * | 8/1965 | Huston | ............... | G01F 23/36 73/313 |
| 3,688,795 A * | 9/1972 | Taylor | ............... | F16K 37/00 137/558 |
| 3,739,641 A * | 6/1973 | Taylor | ............... | G01F 23/38 73/313 |
| 4,554,494 A * | 11/1985 | Howeth | ............... | G01F 23/52 318/482 |
| 5,311,776 A * | 5/1994 | Morris | ............... | B65D 59/00 138/96 T |
| D379,316 S * | 5/1997 | Williamson | ............... | D10/96 |
| 6,041,650 A * | 3/2000 | Swindler | ............... | G01F 23/34 116/229 |
| 6,188,022 B1 | 2/2001 | He | | |
| 6,336,362 B1 * | 1/2002 | Duenas | ............... | G01F 15/063 73/313 |
| 6,490,922 B1 | 12/2002 | Sprea et al. | | |
| 6,564,632 B2 * | 5/2003 | Ross, Jr. | ............... | G01F 23/34 73/290 R |
| 6,762,679 B1 | 7/2004 | Diaz | | |
| 7,690,323 B2 * | 4/2010 | Ross, Jr. | ............... | G01D 11/245 116/305 |
| 7,921,873 B2 * | 4/2011 | Ross, Jr. | ............... | F16K 1/307 137/447 |
| 9,068,877 B2 * | 6/2015 | Ross, Jr. | ............... | G01F 23/34 |
| 9,304,027 B2 * | 4/2016 | Ross, Jr. | ............... | G01F 23/00 |
| 10,175,088 B1 * | 1/2019 | Lease | ............... | G01F 23/34 |
| 10,247,589 B2 * | 4/2019 | Fuller | ............... | G01F 1/38 |
| 10,319,212 B2 * | 6/2019 | Gabay Villafana | ............... | G01R 33/06 |
| 10,440,453 B2 * | 10/2019 | Haddy | ............... | G01S 19/13 |
| 10,552,721 B2 * | 2/2020 | Carr | ............... | H04W 4/35 |
| 10,724,893 B2 * | 7/2020 | Gabrys | ............... | F17C 13/028 |
| 10,812,879 B2 * | 10/2020 | Haddy | ............... | G01F 23/0076 |
| 10,863,254 B2 * | 12/2020 | Rivals | ............... | H04Q 9/00 |
| 2004/0079152 A1 | 4/2004 | Sorenson et al. | | |
| 2009/0103997 A1 | 4/2009 | Csik et al. | | |
| 2010/0294037 A1 * | 11/2010 | De Leo | ............... | G01F 23/38 73/317 |
| 2012/0260844 A1 * | 10/2012 | Ross, Jr. | ............... | G01F 23/00 116/227 |
| 2013/0181829 A1 * | 7/2013 | Schnitz | ............... | G06Q 10/08 340/539.1 |
| 2015/0330828 A1 | 11/2015 | Colvin, Jr. | | |
| 2018/0238729 A1 | 8/2018 | Haddy et al. | | |
| 2020/0021897 A1 * | 1/2020 | Rivals | ............... | H04Q 9/00 |
| 2020/0125910 A1 | 4/2020 | Carr | ............... | F17C 13/003 |
| 2020/0225072 A1 * | 7/2020 | Haddy | ............... | G01F 23/72 |
| 2021/0099775 A1 * | 4/2021 | Rivals | ............... | H04Q 9/00 |

* cited by examiner

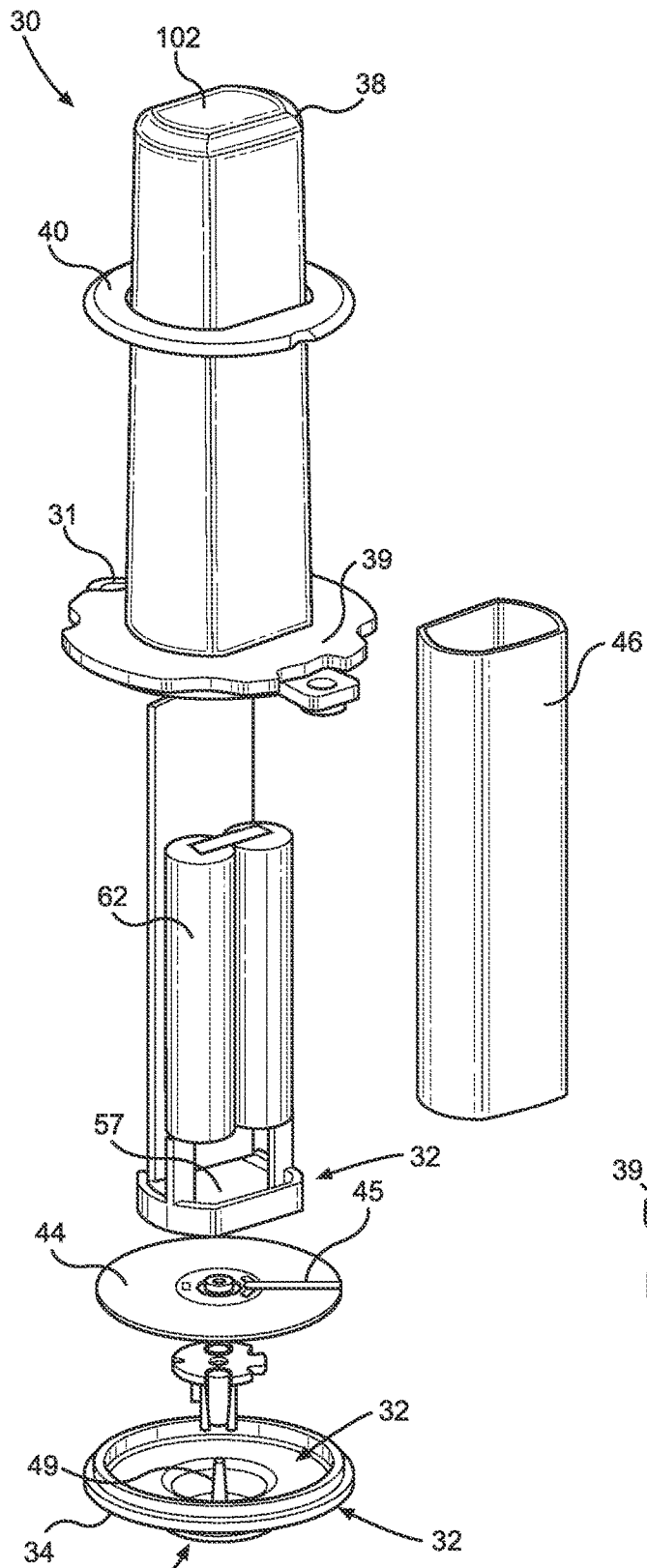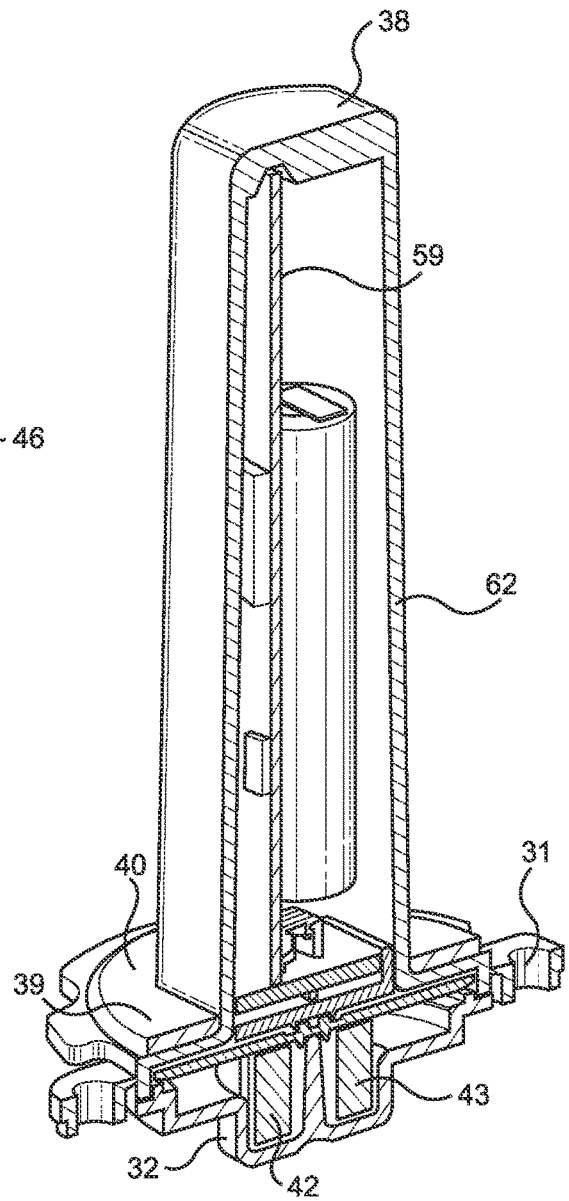

TELEMETRIC FITTING AND METHOD OF TELEMETRIC MEASUREMENT

CROSS-REFERENCE TO RELATED APPLICATIONS

This application is a continuation-in-part of PCT/AU2017/051151 filed Oct. 21, 2017, and claims priority to Australian Patent Application No. 2016904289, filed Oct. 21, 2016, which are incorporated herein by reference in their entireties.

BACKGROUND OF THE INVENTION FIELD OF THE INVENTION

The disclosure herein generally relates to a telemetric fitting and a method of telemetric measurement, and particularly but not exclusively to a telemetric fitting for a liquid-level gauge attached to a vessel, and to a method of telemetric measurement of a liquid level within a vessel. The disclosure further relates to a housing base configured for attachment to a plurality of gauge head configurations.

DESCRIPTION OF RELATED ART

Fuels that are gaseous at standard ambient temperature and pressure ("gas fuels") may comprise, for example, methane, ethane, propane, butane, pentane, and mixtures of two or more of these hydrocarbons. Standard ambient temperature and pressure is 25 deg. C. and 101 kPa. Gas fuels may also comprise small amounts of other gases including propylene, butylene, and additives, including, for example, odorant gasses in the form of ethanethiol, tetrahydrothiophene, or amyl mercaptan for the detection of gas leaks.

Gas fuels may be compressed to form a liquefied gas fuel. For example, butane, propane, and fuels containing mixtures of these hydrocarbons may be sold as liquefied petroleum gas or liquid propane gas, either of which may be abbreviated to LPG. A liquefied gas fuel may be stored in a pressure vessel, examples of which include, but are not limited, to cylinders and tanks, including LPG bulk storage tanks ("LPG bullet tanks"), and liquefied natural gas storage tanks.

Within the pressure vessel is an interface between the liquefied gas fuel and the vapour thereof. The vapour is located above the liquefied gas fuel and within an upper part of the pressure vessel. A vapour outlet in the form of a vapour outlet valve assembly, may be attached to the upper part of the pressure vessel.

The quantity of liquefied gas fuel within a pressure vessel may be determined using a liquid-level gauge, in the form of a float-level gauge, an example of which is shown in FIG. 1 and generally indicated by the numeral 10. The float-level gauge of FIG. 1 is used with LPG bulk storage tanks. Manufacturers of float-level gauges include ROCHESTER, TAYLOR and COTRAKO brand float-level gauges. The float-level gauge comprises a float 12 connected to a stem 14 via a movable joint 16, and a head 18 from which the stem 14 depends. The head 18 is shown in further detail in a top perspective view thereof in FIG. 2. The level float-gauge 10 penetrates a pressure vessel wall and the head 18 is externally attached thereto with bolts that pass through bolt passageways 20 to a flange or other suitable mount that is integrated with the pressure vessel, for example by welds or screws. A seal that surrounds the penetrating stem 14 may be sandwiched between the head 18 and a flange integrated with the pressure vessel wall.

The float 12 follows the interface between the liquefied gas fuel and the vapour thereof. A magnet located at the head 18 is operationally coupled to the float 12. Movement of the float 12 is transmitted to the magnet via a gear system at the joint 16. Vertical movement of the float 12 is transformed to a rotation of the magnet at the head 18, and consequently a rotation of the magnet's magnetic field. The magnet is mounted to rotate around the stem axis. Generally, the magnetic field may be followed by a user-visible external needle, the orientation of which may indicate the height of the float and the interface that the float follows. The use of the magnet enables measurement of the quantity of liquefied gas fuel within the pressure vessel while maintaining a high strength seal, enhancing safety.

Other pressure vessels may be fitted with a pressure gauge for determining the quantity of fluid therein.

When a user observes that the gauge indicates that the contents within the pressure vessel is low, the user may contact a gas supply company to refill the pressure vessel with liquefied gas fuel.

While the description above specifically mentions liquefied gas fuel, the description may generally apply for any suitable type of liquid within a vessel that may or may not be pressurised, for example liquefied ammonia, cryogenic liquids, including liquefied natural gas and liquefied permanent gases, and refined petroleum products, including petrol, kerosene, and fuel oil.

BRIEF SUMMARY OF THE INVENTION

Disclosed herein is a telemetric fitting for a liquid-level gauge. The telemetric fitting is configured to derive liquid-level information from the liquid-level gauge when attached thereto and wirelessly transmit at radio frequencies the liquid-level information.

The liquid-level gauge may be attached to a vessel, for example, a liquefied gas fuel pressure vessel, in the form of an LPG bulk storage tank, or generally any suitable vessel for any suitable liquid, including liquefied ammonia, cryogenic liquid, and a refined petroleum product.

In an embodiment, the telemetric fitting comprises a gauge interface configured to be attached to the liquid-level gauge and derive liquid-level information therefrom. The telemetric fitting may comprise a radio for wirelessly transmitting at radio frequencies the liquid-level information.

The vessel, tank, or asset described herein is a pressure vessel in the form of a LPG bulk storage tank, but the vessel may alternatively be any of a cylinder or a tank for any suitable fluid, examples of which include liquefied gas fuel, liquefied ammonia, cryogenic liquids, including liquefied natural gas and liquefied permanent gases, water, solutions, liquid chemicals, and refined petroleum products, including petrol, kerosene, and fuel oil. Furthermore, the tank can be referred to as an asset, wherein the asset can be, for example, any fuel handling and storage systems. While a magnetically-enabled float gauge fuel-level sensor system is discussed in detail, it is understood that a fluid-level or fuel-level sensing device can be enabled by any type of technology, for example, ultra-sound/ultrasonic, optical, pressure, ammeters, voltmeters, and any other type of sensor system and any fluid-level detection is within the scope of this discussion.

In an embodiment, the radio comprises at least one of a medium-range radio network interface and a long-range radio network interface for transmitting the liquid-level information. The radio may comprise a low-power, wide-area network interface for transmitting the liquid-level information.

In an embodiment, the gauge interface is configured to derive liquid-level information from a liquid-level dependent magnetic field generated by the liquid-level gauge. The gauge interface may comprise a magnetic sensor configured to be responsive to a liquid-level dependent magnetic field generated by the liquid-level gauge. The magnetic sensor may be a magnetic field orientation sensor.

An embodiment comprises an exterior housing. Disposed in the exterior housing may be the magnetic sensor and the radio.

An embodiment comprises a mechanical dial arranged to fit to an external surface of the exterior housing, the dial providing human-readable fluid-level information. The mechanical dial may be removable. The mechanical dial may be selected from a plurality of different mechanical dials, each being arranged to fit to the external surface of the exterior housing. Each of the different mechanical dials may be compatible with one of a different liquid-level gauge configuration and a different tank configuration.

An embodiment comprises at least one ferromagnetic element supported by a bearing assembly for following the magnetic liquid-level-dependent magnetic field and disposed between an electronic magnetic field sensor and the liquid-level gauge when attached thereto. The magnetic sensor may be configured to sense an orientation of the at least one ferromagnetic element. The bearing assembly may comprise a single journal.

An embodiment comprises a human-readable mechanical indicator for indicating liquid-level information. The human-readable mechanical indicator may be disposed within the exterior housing. The human-readable mechanical indicator may be mechanically coupled to the ferromagnetic element, such that movement of the ferromagnetic element drives movement of the mechanical indicator.

The ferroelectric element may be configured to produce at least one of a predetermined magnetic field structure and a predetermined magnetic field strength the magnetic sensor.

An embodiment does not extend beyond a perimeter of a liquid-level gauge head when attached to the liquid-level gauge, however another embodiment may extend beyond the perimeter of the liquid-level gauge head when attached to the liquid-level gauge.

In an embodiment, the gauge interface is configured to engage with any one of a plurality of differently-configured float-level gauge heads.

Disclosed is a telemetric fitting for a usage gauge of a vessel, the usage gauge including a gauge head, the telemetric fitting including for example, a housing, and a base supporting the housing wherein the base is configured for attachment to a plurality of gauge head, configurations, wherein the base can include at least two tabs for attaching the base to a first gauge head, and wherein the tabs are capable of being removed to reconfigure the base for attachment to a second gauge head.

Also disclosed is a telemetric fitting for a usage gauge of a vessel, the usage gauge including a gauge head, the telemetric fitting including, for example, a housing, and a base supporting the housing, wherein the base is for attachment to the gauge head, wherein the base is configured for attachment to a plurality of gauge head configurations, wherein the base can include scalloped outer edge portions, and wherein the scalloped outer edge portions are for fitting the base around fastener heads of a gauge head.

Additionally disclosed is a telemetric fitting for a usage gauge of a vessel, the usage gauge including a gauge head, the telemetric fitting including for example, a housing, and a base supporting the housing, wherein the base is for attachment to the gauge head, wherein the base is configured for attachment to a plurality of gauge head configurations, wherein the base includes an outer edge, and at least two tabs for fitting to a first gauge head, wherein the tabs are capable of being removed, and wherein fastener receiving ports remain on the outer edge replacing the tabs when the tabs have been removed.

Moreover, disclosed is a base of any type having a window through which to view a human-readable indicator.

An embodiment comprises an electric power source. The electric power source may comprise at least one of a battery and an energy harvesting system.

Disclosed herein is a telemetric fitting for a liquid-level gauge. The telemetric fitting comprises an exterior housing, in which is mounted a magnetic sensor, a radio and a processor. The exterior housing is configured to be attached to the liquid level gauge, and when so attached, the magnetic sensor is magnetically coupled to a liquid-level-dependent magnetic field generated by the liquid-level gauge for generating magnetic field information. The processor is configured to derive liquid-level information using the magnetic field information for transmission by the radio.

Disclosed herein is a telemetric fitting for a gauge. The telemetric fitting is configured to derive measurement information from the gauge when attached thereto, and to radio the measurement information. The measurement information is indicative of a quantity.

The gauge interface may be configured to derive the measurement information from a quantity-dependent magnetic field generated by the gauge.

An embodiment comprises at least one ferromagnetic element arranged to follow an orientation of the quantity-dependent magnetic field.

The gauge may be a liquid-level gauge and the measurement information may be liquid-level information. Alternatively, the gauge may be a pressure gauge, and the measurement information may be pressure information. Generally, the gauge may be any suitable gauge for generating any suitable type of measurement information indicative of a quantity.

In an embodiment, the telemetric fitting comprises a gauge interface configured to be attached to the gauge and derive measurement information therefrom, and may comprise a radio for wirelessly transmitting at radio frequencies the gauge information.

In an embodiment, the radio comprises at least one of a medium-range radio network interface and a long-range radio network interface, for example a low-power wide-area network interface for transmitting the measurement information.

In an embodiment, the gauge interface is configured to derive measurement information from a physical property (for example pressure or liquid-level) on which is dependent a magnetic field generated by the gauge. The gauge interface may comprise a magnetic sensor configured to be responsive to the physical-property-dependent magnetic field generated by the gauge. The magnetic sensor may be a magnetic field orientation sensor.

An embodiment comprises an exterior housing. Disposed in the exterior housing may be the magnetic sensor and the radio.

Disclosed herein is a method of telemetric measurement of a liquid level within a vessel. The method comprises deriving liquid-level information from a liquid-level gauge attached to the vessel with a telemetric fitting attached to the liquid-level gauge. The method comprises the telemetric fitting wirelessly transmitting the liquid-level information so derived.

An embodiment comprises attaching the telemetric fitting to the liquid-level gauge.

An embodiment comprises wirelessly transmitting the liquid-level information over at least one of a medium-range radio network and a long-range radio network, for example a low-power, wide-area network.

An embodiment comprises deriving liquid-level information from the liquid-level gauge with a gauge interface of the telemetric fitting. The gauge interface may derive the liquid-level information by sensing a liquid-level-dependent magnetic field generated by the liquid-level gauge. The gauge interface may derive the liquid-level information by sensing the orientation of the liquid-level-dependent magnetic field generated by the liquid-level sensor.

An embodiment comprises magnetically deriving the liquid-level information from the liquid-level gauge.

An embodiment comprises selecting a dial of a plurality of dials for a plurality of differently configured liquid-level gauges. The dial may be attached to an exterior housing of the telemetric fitting. Alternatively, the dial may be disposed within the exterior housing of the telemetric fitting.

An embodiment comprises harvesting energy and powering, with the energy so harvested, the wireless transmission of the liquid-level information so derived.

Disclosed herein is a method of telemetric measurement of a physical property. The method comprises deriving measurement information from a gauge attached to a vessel with a telemetric fitting attached to the gauge. The method comprises the telemetric fitting wirelessly transmitting at radio frequencies the measurement information so derived.

Any of the various features of each of the above disclosures, and of the various features of the embodiments described below, can be combined as suitable and desired.

BRIEF DESCRIPTION OF THE SEVERAL VIEWS OF THE DRAWINGS

Embodiments will now be described by way of example only with reference to the accompanying Figures in which:

FIGS. 9 and 10 show an exploded perspective view and a cutaway perspective view of the telemetric fitting of FIGS. 3 and 4, respectively.

DETAILED DESCRIPTION OF THE INVENTION

Figure 2:
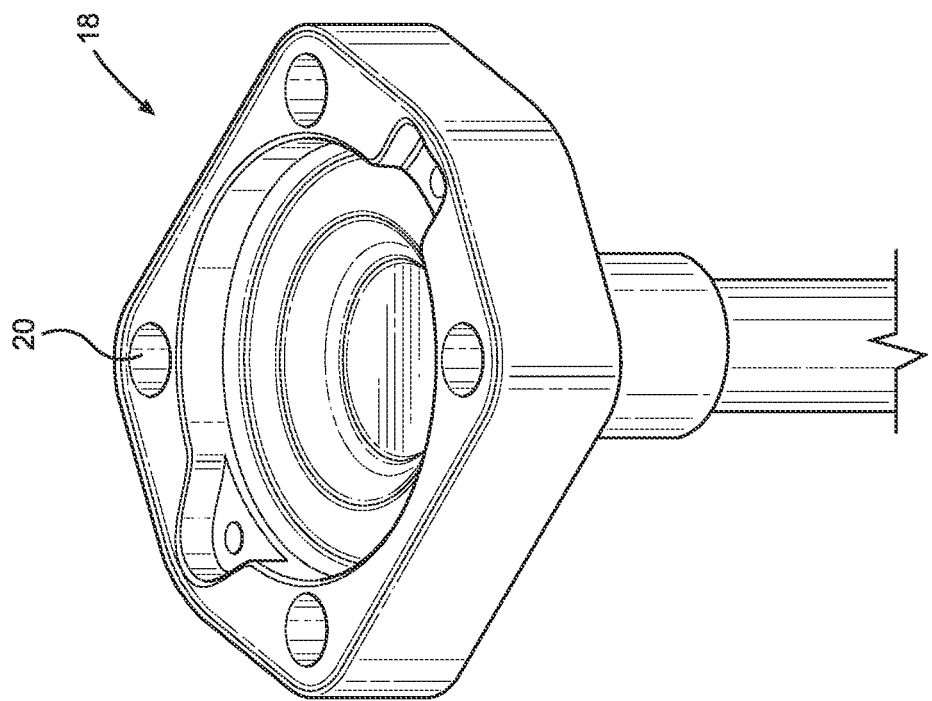
FIG. 2 shows a perspective top view of a head of the float-level gauge of FIG. 1.
Figure 1:
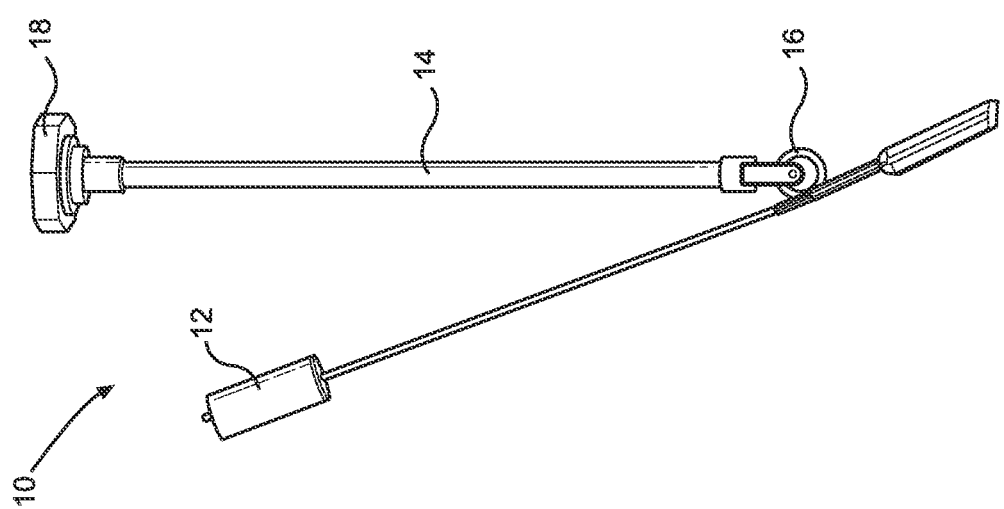
FIG. 1 shows a side perspective view an example of a prior art float-level gauge.
Figure 4:
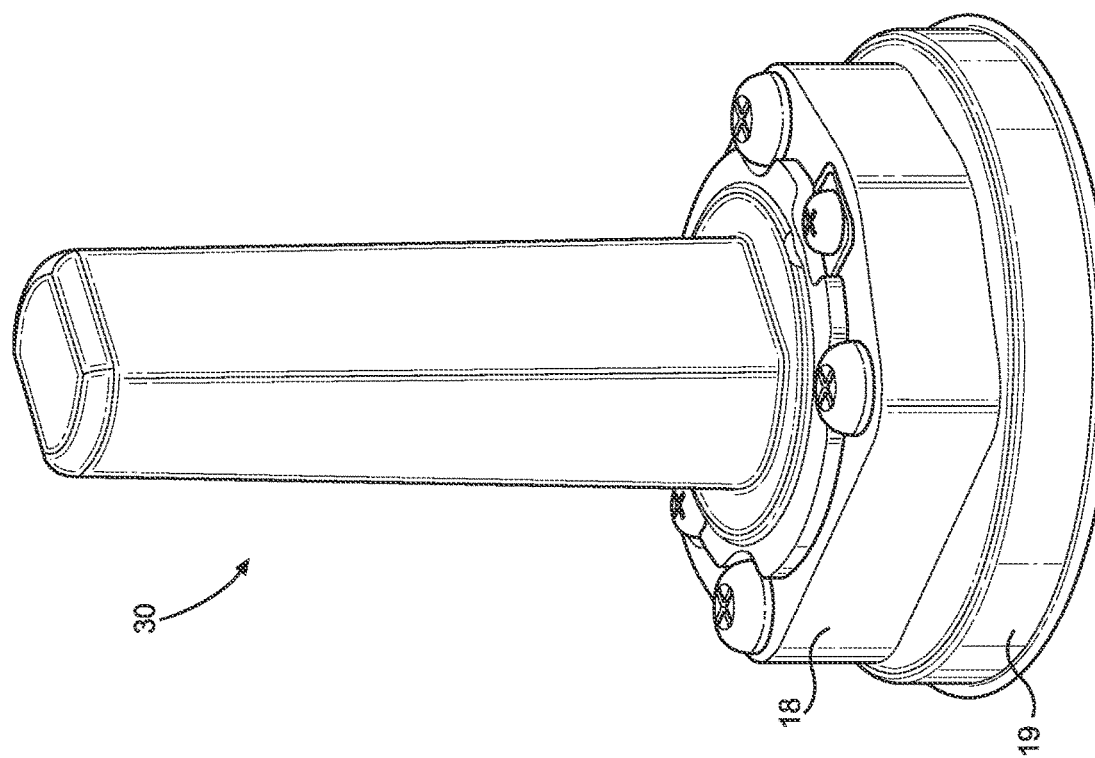
FIG. 4 shows a perspective view of the telemetric fitting of FIG. 3 attached to a liquid level gauge attached to a tank.
Figure 3:
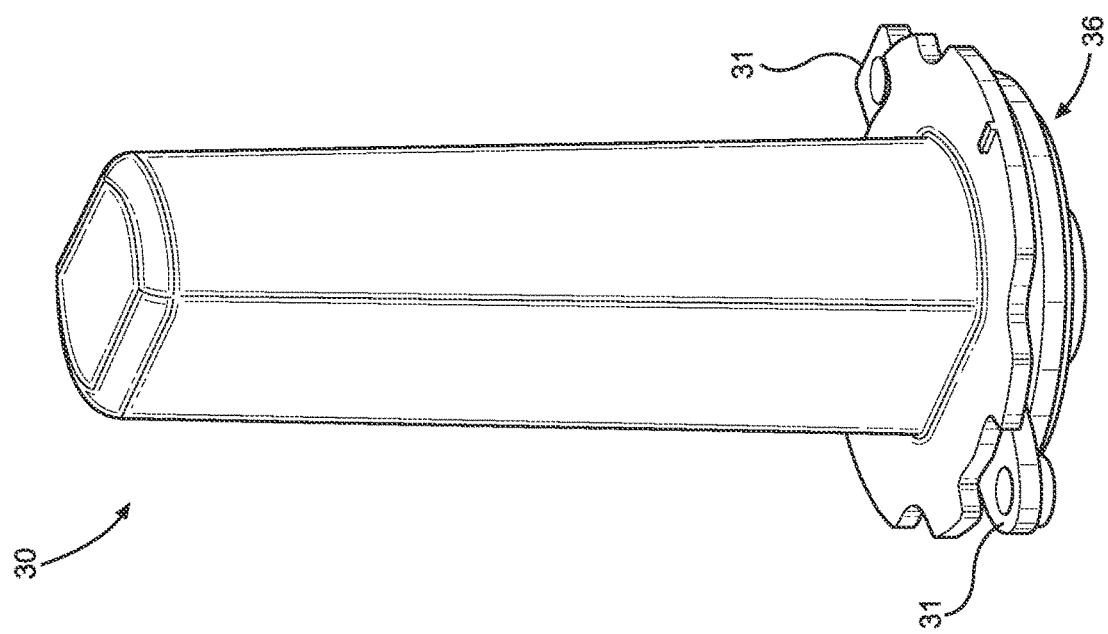
FIG. 3 shows a perspective view of an embodiment of a telemetric fitting for the liquid-level of FIG. 1.

FIG. 3 shows a perspective view of an embodiment of a telemetric fitting for a liquid-level gauge attached to a vessel, the telemetric fitting being generally indicated by the numeral 30. FIG. 4 shows another perspective view of the telemetric fitting 30, attached to the head 18 of a liquid-level gauge attached to a vessel 19. The liquid-level gauge in this embodiment is the float-level gauge 10 described above with reference to FIGS. 1 and 2, however, generally any suitable liquid-level gauge may be used. The telemetric fitting 30 is configured to derive liquid-level information indicative of a liquid-level from the liquid-level gauge, when attached thereto, and to wirelessly transmit at radio frequencies the liquid-level information.

In the example shown in FIG. 4, the vessel 19 is a pressure vessel in the form of a liquefied gas fuel pressure storage vessel, specifically an LPG bulk storage pressure vessel, however, the vessel may be any suitable pressurised or non-pressurised vessel, examples of which include an LPG cylinder, a cryogenic vessel for a permanent gas, liquefied natural gas or other fluid, an ammonia storage vessel, and a refined petroleum product storage vessel.

The telemetric fitting comprises a plurality of tabs 31 penetrated by fasteners in the form of screws that attach the telemetric fitting 30 to the gauge head 18 (although any suitable fasteners, including bolts, rivets, clips, etc, or adhesive, may be used). Removeable tabs 31a and 31b of an embodiment of a base 150, which can be configured to fit a plurality of gauge head configurations, are depicted, for example, in FIGS. 18-24 as discussed below.

Figure 5:
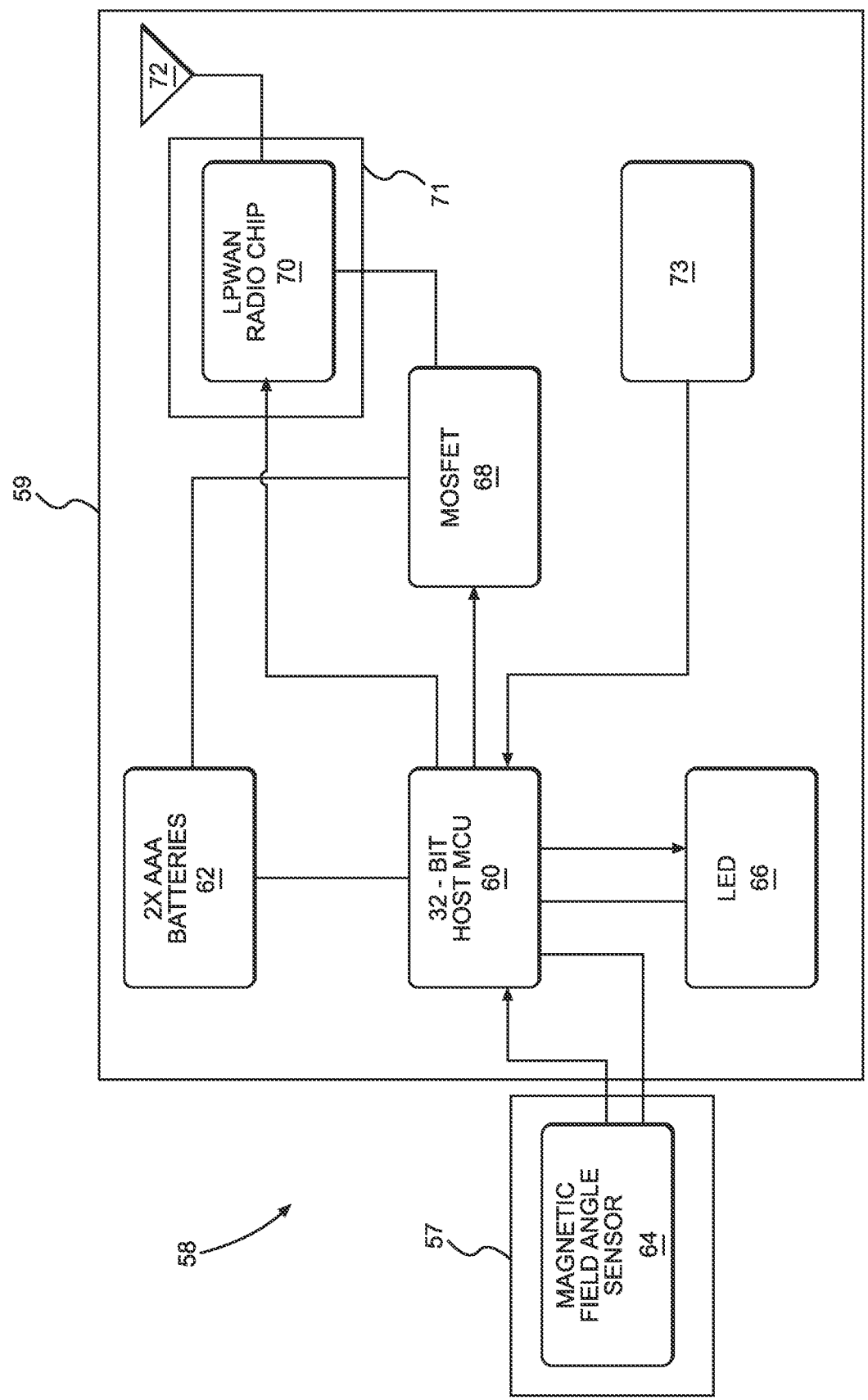
FIG. 5 shows a block diagram showing electronics for the telemetric fitting of FIGS. 3 and 4.

FIG. 5 shows a block diagram showing electronics 58 for the telemetric fitting 30. Connecting lines with arrows are information conduits, and connecting lines without arrows are power conduits. The electronics comprise at least one printed circuit board assembly (PCBA) 57, 59. The electronics 58 comprise a plurality of electrical components, at least some of which are mounted on a printed circuit board of the at least one PCBA 57, 59. The plurality of electrical components comprises at least one of a processor 60, in the form of a logic device, which in this embodiment, includes a host micro-controller unit 60, an electronic magnetic sensor 64, in the form of an electronic magnetic field angle sensor (which is analogue, however, it may alternatively be digital), and a radio 71, in the form of a radio transceiver, the radio comprising at least one of a medium-range radio network interface and a long-range radio network interface, an antenna 72, and a power switch, in the form of a MOSFET 68, indicator lights, in the form of at least one LED 66, and an electrical power source, in the form of at least one battery 62 that provides power to the radio 71 via the MOSFET 68 and the processor 60. The processor 60 is in electrical communication with the MOSFET 68. The MOSFET 68 and the processor 60 cooperate to switch off the power to the radio 71 when it is not transmitting liquid-level information or other data. Another form of switch, for example, a relay, may be used instead. The radio 71 is within a module, which may consume more power than desired, even when not transmitting. Switching off the power to the module reduces the power consumption of the electronics 58, which may generally extend the life of the at least one battery 62 to, for example, 15 years. In an alternative embodiment, the electrical power source comprises an energy harvesting system that harvests mechanical energy (e.g., vibrations), electromagnetic energy (e.g., radio waves, light), or heat. For example, the energy harvesting system may comprise a solar cell, or piezo-electric generator. The electronics 58 also include a magnetic switch 73.

Medium-to-long range wireless links enable transmission to centralized data centers, for example, using either private or commercial radio base stations.

In this embodiment, the radio network interface comprises a low-power, wide-area network (LPWAN) interface. The LPWAN interface comprises a low-power, wide-area network radio (LPWAN) integrated circuit 70. The LPWAN interface comprises a physical LPWAN interface in communication with the antenna 72. An LPWAN is a type of wireless communications network for medium-to-long range communications, at bit rates that are generally, but not necessarily, low, and having low power consumption when compared to cellular communication technologies for voice and high-bandwidth data services. Examples of LPWAN include, but are not limited, to LoRaWAN, and Sigfox. The LPWAN radio integrated circuit may be within an LPWAN radio module. The range achieved LPWAN depends on many factors, including the presence of obstacles in the transmission path, but ranges of more than 5 km are common, for example, 5-10 km.

Alternative embodiments may have a radio 71 comprising another type of medium-range radio network interface or long-range radio network interface, for example, a cellular radio network interface (examples of which include, but are not limited, to GSM, CDMA, and LTE cellular radio network interfaces), IEEE 802.11 interface ("Wi-Fi") and a satellite communications interface.

The electronic magnetic field angle sensor 64 may not be sensitive to ambient temperature changes, as magnetic field strength sensors generally are. Consequently, the use of an electronic magnetic field angle sensor 64 may increase accuracy. In alternative embodiments, however, the strength of the magnetic field may be sensed for deriving the liquid-level measurement. Any suitable type of magnetic sensor can be used, for example, a Hall effect sensor. Other types of sensors that may be suitable include a giant magnetoresistance (GMR) sensor, an anisotropic magnetoresistance (AMR) sensor, a tunnelling magnetoresistance (TMR) sensor, and 3D magnetic sensor.

Figure 8:
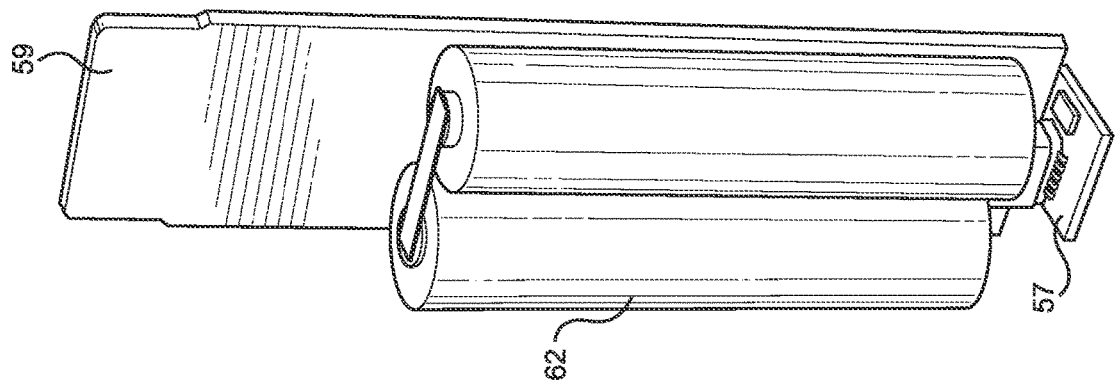
FIGS. 6-8 show perspective views of printed circuit board assemblies of the telemetric fitting of FIGS. 3 and 4.
Figure 7:
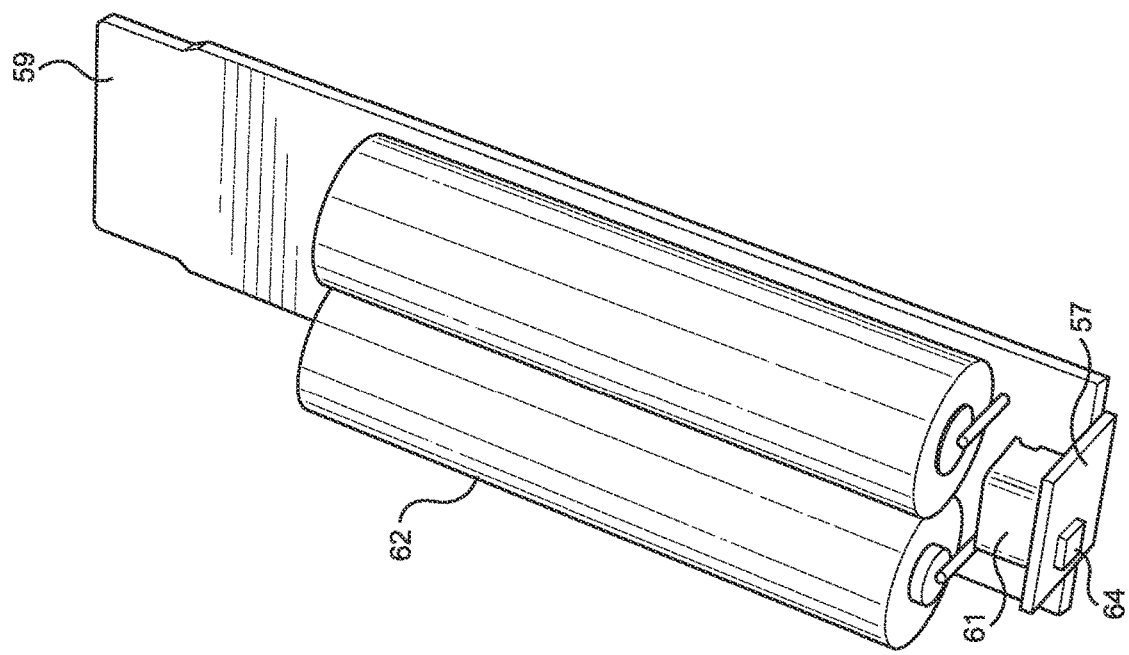
Figure 6:
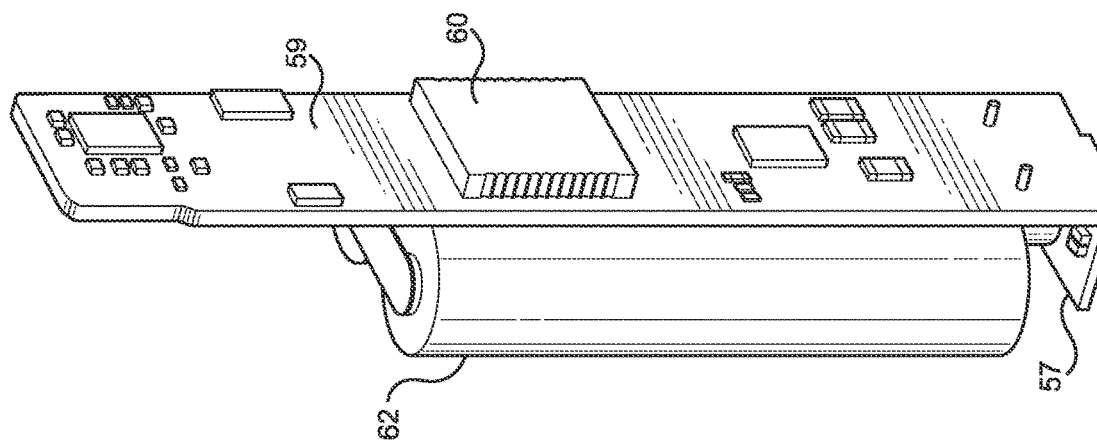

FIGS. 6 to 8 show perspective views of the PCBAs 57 and 59 that are orthogonal to each other and are joined using a board-to-board connector 61 in the form of a header. The board-to-board connector can be a flex circuit instead. In alternative embodiments, one of the PCBAs 57 and 59 is a flexible circuit board layer extending from the other. Using a vertically disposed PCBA 59 allows the telemetric fitting to have a relatively smaller footprint, which may facilitate its use on tanks with many nearby fittings and ports. The use of the horizontally disposed PCBA 59 provides a suitable orientation for the electronic magnetic sensor 64 mounted thereto to sense the magnetic field orientation. In an alternative embodiment, the electronic magnetic sensor 64 may be configured to sense the magnetic field orientation when mounted on the vertically disposed PCBA 59 (for example, on a lower edge of PCBA 57), in which case the horizontally disposed PCBA 57 may not be required.

FIGS. 9 and 10 respectively show an exploded perspective view and a cutaway perspective view of the telemetric fitting 30. The telemetric fitting 30 has opposite ends 36, 102, with a gauge interface 32 at end 36. The gauge interface 32 is configured to derive liquid-level information from a liquid-level gauge using, for example in this embodiment, a liquid-level dependent magnetic field generated by the liquid-level gauge. The telemetric fitting 30 is configured such that the magnetic field generated by the liquid-level gauge rotates around a longitudinal axis thereof. The magnetic field generated by the liquid-level gauge may be sensed directly by the electronic magnetic field angle sensor 64. In this embodiment, however, at least one ferromagnetic element 42, 43 (two in the present embodiment, however other embodiments may have more or less) follows and rotates with the magnetic field, and the magnetic field of the at least one ferromagnetic element 42, 43 is sensed by the electronic magnetic field angle sensor 64. The at least one ferroelectric element 42, 43 has a predetermined magnetic field structure in the region of the magnetic sensor 64. On the other hand, the magnetic field of the liquid-level gauge may vary considerably more in strength and structure from one gauge to another. The at least one ferroelectric element 42, 43 couples to the magnetic field of the liquid-level gauge and may help to produce a more consistent magnetic field structure and strength sensed by the magnetic sensor 64.

Figure 17:
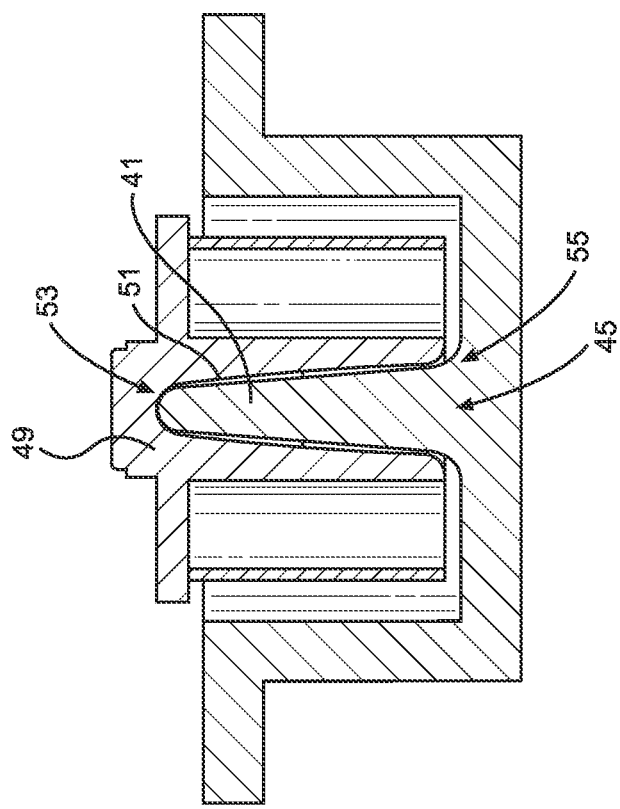
FIG. 17 shows is greater detail the cross-section of the magnetic holder of FIG. 16.
Figure 16:
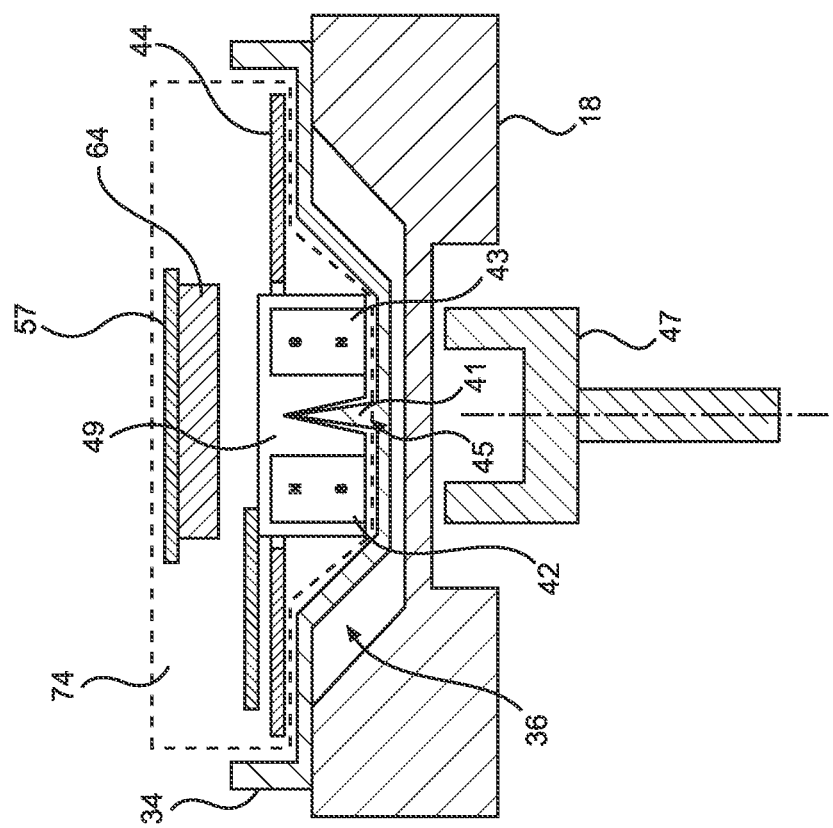
FIG. 16 shows a cross-sectional elevation view of an approximation of a magnetic sensor of the embodiment of FIG. 3.

The at least one ferromagnetic element 42, 43 and the electronic magnetic sensor are parts of a magnetic sensor shown approximately in FIG. 16, with a more accurate detail thereof shown in FIG. 17 without magnets. In use, the at least one ferromagnetic element 42, 43 is magnetically coupled to the magnetic field generated by magnet 47 within the liquid-level sensor head 18. The at least one ferromagnetic element 42, 43 is between the end 36 and the sensor 64 and the PCBA 57. In this embodiment, the at least one ferromagnetic element 42, 43 comprises at least one magnet in the form of a permanent magnet, however, it may comprise a ferromagnetic material, for example, iron or cobalt, that is not a permanently magnetised, but temporarily magnetised by the magnetic field generated by the liquid-level gauge. The magnetic sensor senses the orientation of the magnetic field generated by the liquid level gauge, which is dependent on the liquid-level within the vessel 19.

The ferromagnetic element 42 in this embodiment is one of two magnets 42, 43 arranged symmetrically around a central axis and held by a ferromagnetic element holder 49 in the form of a magnet holder. The magnet holder 49 is supported by a journal 41 to form a rotary bearing assembly 45 for rotation of the magnet holder 49 around the longitudinal axis, enabling the magnets 42, 43 to rotate with the liquid-level dependent magnetic field. A bearing surface 51 within the magnet holder 49 receives the journal 41. The journal 41 is in the form of a peg or spigot, which in this embodiment, but not all embodiments, is integral with the end 36. The journal 41 penetrates more than half way through the magnet holder 49, which may provide superior balance. The bearing assembly 45 comprises a first bearing component 53 in the form of a thrust bearing at the tip of the journal 41 for supporting the magnet holder 49, and a second bearing component in the form of a radial bearing 55 for orientating the magnet holder 49 to the central axis, especially when one magnet is misaligned or has a magnetic strength that is not equal to the other magnet. The magnet holder 49 is held down on the bearing assembly 45 by the magnetic attraction of the at least one magnet 42, 43 to the magnet 47 within the liquid-level sensor head 18, which generally, but not necessarily, removes the need for a second journal engaged with the other side of the magnet holder 49. The use of a single journal, instead of two journals on opposite sides of the magnetic holder, reduces the separation between the at least one ferromagnetic element 42, 43 and the electronic magnetic sensor 64, which may increase the strength of the magnetic field at the electronic magnetic sensor 64 and improve the measurement accuracy.

The surface of the journal 41 and the bearing surfaces 51, 55 comprise dissimilar materials for a low coefficient of friction. The materials are selected for a low coefficient of friction to maximise the bearing performance. In this embodiment, the journal 41 is polycarbonate and the magnet holder 49 is PolyOxyMethylene ("ACETAL"), however, any suitable materials may be used.

The magnets 42, 43 have opposite magnetic orientation. Since like poles repel and opposite poles attract, this ensures that the magnets 42, 43 magnetically couple to the two opposite magnetic poles of shaped arms of the magnet 47 in the head 18, which generates the liquid-level dependent magnetic field. Without the opposite magnetic orientations of the magnets 42, 43, it is possible for the magnets to be 180 degrees in error, which may result in a spurious reading.

The micro-controller unit 60 receives raw magnetic field information in the form of magnetic field orientation information generated by a magnetic sensor, in this embodiment from an output of the electronic magnetic sensor 64. The magnetic field orientation information comprises three voltages from three arms of a bridge within the sensor 64. The micro-controller 60 executes a program that comprises an algorithm specified by the sensor manufacturer for calculating magnetic field orientation information indicative of an angle of the magnetic field from the received raw magnetic field information. The magnetic field orientation information is indicative of the liquid-level. The magnetic field orientation information comprises a string of symbols that encode an angle for the orientation of the magnetic field. The micro-controller 60 sends the magnetic field orientation information to the radio for transmission of the liquid-level information. The radio encapsulates the string of symbols in accordance with the LPWAN protocol and subsequently sends the encapsulated string of symbols, optionally together with telemetric fitting identification information indicative of the identification of the telemetric fitting. The LPWAN protocol may include identification information, for example, a Sigfox DeviceID or LoRaWAN end-device address. The magnetic field orientation information is received by a computer server that can access information about the type of gauge that the telemetric unit 30 is attached to and thus calculate, using the magnetic field orientation information, the liquid level in a percent of total vessel water volume or generally any suitable other unit, for example volume of remaining liquid in the vessel. The server has a data store in the form of a database that associates the identification information of a plurality of telemetric fittings with information about the gauge and/or vessel to which each is attached. The database may be populated by keyboard entry, for example.

In an alternative embodiment, the micro-controller unit 60 has a lookup table stored in memory for associating the sensed magnetic field angle with liquid-level information. In this embodiment, but not all embodiments, the liquid-level information comprises a string of symbols that encode the remaining volume of liquid as a percentage. The micro-controller determines the liquid-level information from the lookup table and subsequently sends the liquid-level information to the radio for transmission of the liquid-level information. In an alternative embodiment, the micro-controller unit 60 includes software for calculating the liquid level as a function of magnetic field angle. Generally, any suitable algorithm may be used to derive the liquid-level information from the magnetic field information generated by the magnetic sensor. The radio encapsulates the string of symbols in accordance with the LPWAN protocol and subsequently sends the encapsulated string of symbols, together with telemetric fitting identification information indicative of the identification of the telemetric fitting.

Coupled to the at least one ferromagnetic element 42, 43 is an indicator 44 in the form of a disk having an index mark or pointer 45. The index mark or pointer may be pad printed, a label attached with adhesive, or otherwise formed or made, for example, by laser machining. The indicator 44 is mechanically coupled to the magnet holder via a clip and rotates with the at least one ferromagnetic element 42, 43. The telemetric fitting 30 comprises a two-part transparent exterior housing 38, made of impact-resistant polycarbonate, in which are disposed the electronics 58. The housing 38 has a transparent window 39 at the end 36 for viewing the indicator 44 from above. Alternatively, in some embodiments, the exterior housing 38 may not be transparent. The exterior housing 38 may be generally formed of any suitable material, including, but not limited to, polymers such as nylon, polypropylene, polythene, and ceramics. The exterior housing 38 may be formed using any suitable process, including, but not limited, to injection and other types of moulding, milling, and three-dimensional printing.

A human-readable dial 40 is attached to the exterior housing 38. The dial 40 is at least partly transparent to enable the pointer 45 to be viewed. The telemetric fitting 30 can include a plurality of dials, each dial having a different visual display, for example, different markings or indicators, different language, different measurement units, different colour, different branding, different warning, or different re-fill level. The plurality of different dials may be compatible with a plurality of differently configured liquid-level gauges, and a compatible dial 40 can be chosen to suit a particular liquid-level gauge configuration. The plurality of different dials may be compatible with a plurality of differently-configured tanks, for example one for vertically-oriented tanks and one for horizontally-oriented tanks, and a compatible dial 40 can be chosen to suit a particular tank configuration. The plurality of different dials may be compatible with a plurality of legal jurisdictions and a compatible dial 40 can be chosen to suit a particular jurisdiction. The plurality of different dials may comprise a range of visual displays to provide human choices, and a dial can be selected based on, for example, human preference or corporate preference. The selected dial 40 can be fitted to the housing 38 when the configuration of the liquid-level gauge and tank is known. For example, an installer may have the option to choose a suitable dial 40 at the installation site to match the configuration of the liquid-level gauge and tank. In at least some embodiments, the dial is removable from the housing 38. A removable dial provides an option to exchange the dial with another dial, for example if the telemetric fitting 30 is moved to a differently-configured liquid-level gauge or tank.

Figure 11:
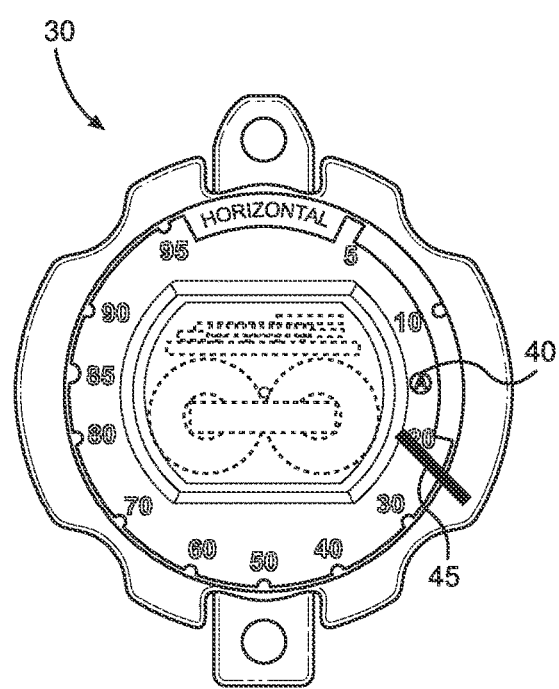
FIG. 11 shows a top plan view of the telemetric fitting of FIGS. 3 and 4.

The dial is attached the housing adjacent the gauge interface 32. The indicator 44 cooperates with the dial 40 for indicating the liquid level in the vessel. For example, the dial may have a scale having the percentage of the tanks water volume printed thereon, or may have "FULL", "REFILL", and "EMPTY", colour or other coding for the liquid level. The dial is oriented to the longitudinal axis of the telemetric fitting 30 for viewing from above. The dial may be moulded or printed, such as on a decal. It may be attached by, for example, friction fit or snap fit, with an adhesive or fastener, or generally any suitable way. FIG. 11 shows a top plan view of the telemetric fitting 30, the dial 40, and the pointer 45. The telemetric fitting 30, and consequently the exterior housing 38, does not extend beyond a perimeter of the gauge head 18 when attached to the liquid-level gauge. In another embodiment, however, the exterior housing does extend beyond the perimeter of the gauge head 18. Some embodiments have a dial with two scales, one for a horizontal tank orientation and another for a vertical tank orientation.

Alternatively, a scale or other liquid-level coding may be printed on the indicator 44, and an index or pointer may be printed on the exterior of the housing, or otherwise attached thereto.

The gauge interface 32 is configured to connect with any one of a plurality of differently-configured float-level gauge heads 18, including "Junior" and "Senior" style float-level gauges. For example, the gauge interface may incorporate features including removable screw mounting tags 31, screw head rims, flanges, and location recesses for alignment to "glue-down" gauges to provide compatibility with ROCHESTER, TAYLOR, and other four-bolt or screwed-in float-level gauges.

Figure 18:
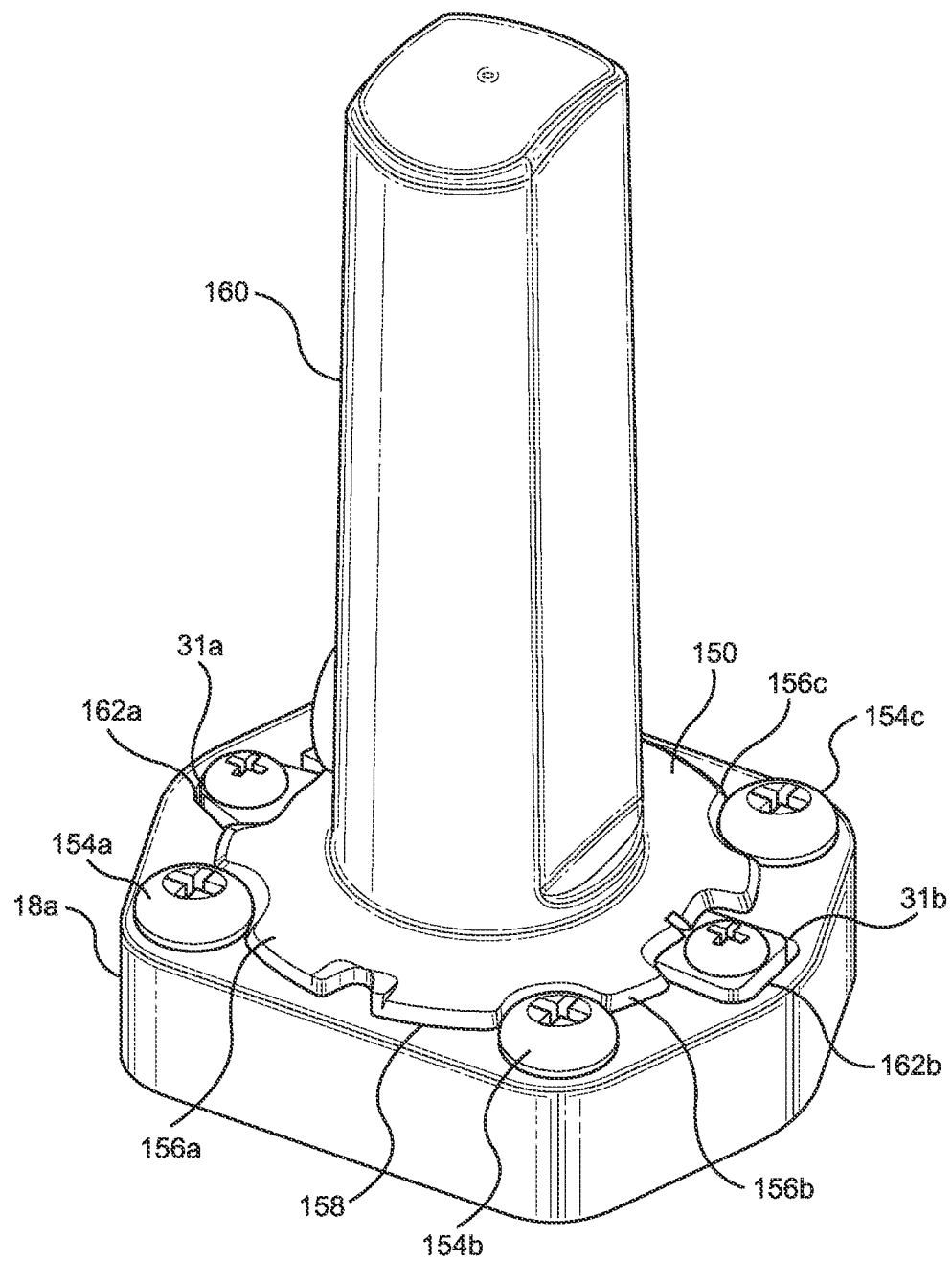
FIG. 18 depicts a perspective view of a disclosed first embodiment of a base configured to fit a plurality of gauge head configurations.

In FIG. 18, a telemetric fitting is depicted as in the preceding figures as fitting 30, 100, or 110. Here, the housing of a telemetric fitting is identified as housing 160. It is understood that any type of or shaped housing, including a type that is made up of two or more pieces, is within the scope of this discussion, where the housing 160 and the base 150 may be formed of a single piece, or more pieces. Furthermore, a gauge head mounted device can include any type of housing configuration. For example, a sensor, which can be attached to a gauge head, can be connected by a wire to a telemetry unit. In other embodiments, a sensor and telemetry unit can be housed together.

As mentioned above, it is understood that a fluid-level or fuel-level sensing device can be enabled by any type of technology, for example, ultra-sound/ultrasonic, optical, pressure, ammeters, voltmeters, and any other type of sensor system and any fluid-level detection is within the scope of this discussion. The particular embodiment having base 150 described with respect to FIGS. 18-22 is provided for illustrative purposes, wherein principles of fitting a base to a plurality of gauge head configurations can be drawn from this example.

In the preceding figures and in FIG. 18, a base 150 supporting a housing 160 is shown, wherein the base 150 can be configured for attachment to a plurality of gauge heads 18. In FIGS. 18-22, a base configured for attachment to a plurality of gauge head configurations is illustrated in more detail. In each of these figures, the gauge head is identified as gauge head 18a-e, as it is understood that each of these gauge heads 18a-18e is different from one another, as indicated in the discussion. That is, there are a plurality of gauge heads shown in FIGS. 18-22. Others that are not shown may be included in the plurality of gauge heads. As discussed, the gauge head in FIG. 18 is depicted as a Rochester Junior™ four-bolt model.

In the embodiments illustrated in FIGS. 18-22, the base 150 fits onto five different gauge heads. By configuring one base to fit, for example, five different gauge heads, resources are saved in manufacturing and distribution. A distributor of fuels to assets utilising the disclosed telemetric fittings, who may install the fittings out in the field, will avoid having to stock five different fitting models, and may only need to stock one model. This saves resources in inventory management and distribution. If a problem arises in the field, and a driver needs a replacement device, a driver can carry one device that can fit many different gauge heads.

In this embodiment, the base 150 includes at least two tabs 31a and 31b for attaching the base to a first gauge head 18a, here a Rochester Junior™ four-bolt model. In FIG. 18, the gauge head 18a includes the four-bolt model, which has four fastener heads 154a, 154b, 154c, and 154d (not shown) around which the scalloped outer edge portions 156a, 156b, 156c and 156d (not shown) of the outer edge 158 of the base fit. A fastener is understood to be any type of fastener. The two tabs 31a and 31b are configured to align within respective tab receiving ports 162a and 162b of a gauge head 18a, wherein the receiving ports are particular receiving ports providing, for example, directional or polarising requirements, so that the base 150 may not be installed incorrectly. In a situation wherein there are no guides similar to receiving ports 162a and 162b, for directional or polarising requirements, instructions may be provided to the user as to the correct installation orientation.

Figure 19:
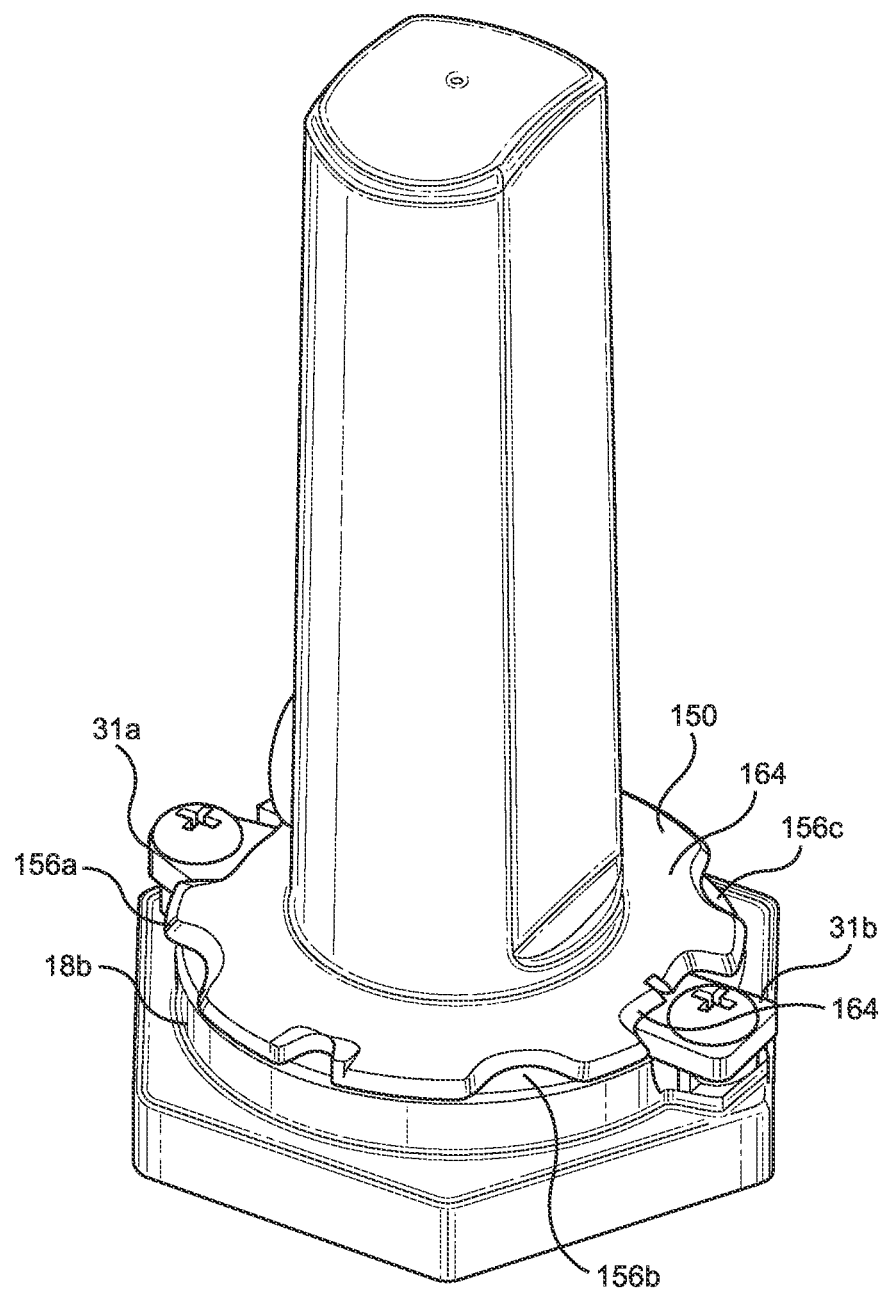
FIG. 19 depicts a perspective view of another disclosed embodiment of a base configured to fit a plurality of gauge head configurations.

Referring to FIG. 19, shown is the disclosed base 150 installed on a Rochester Junior™ Screw-In model gauge head 18b. In this figure, it is apparent that the base 150 has an upper surface 164, and the tabs 31a and 31b are depressed below the upper surface 164. On the Junior™ Screw-In model, the scalloped outer edge portions 156a, 156b, 156c and 156d (not shown) do not fit around the four bolt fastener heads of a gauge head 18b, because the Junior™ Screw-In model does not include the fastener heads.

Figure 20:
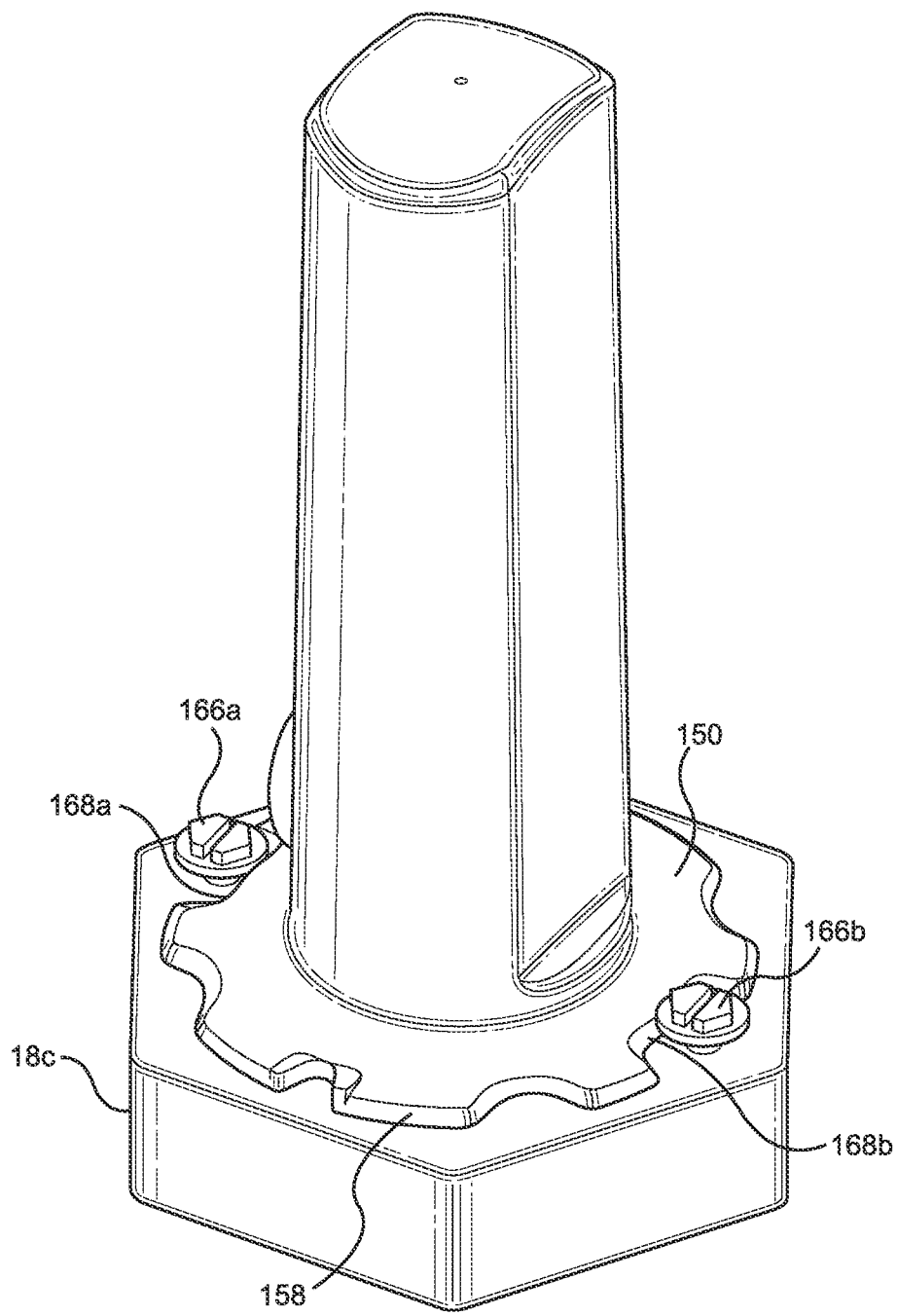
FIG. 20 depicts a perspective view of another disclosed embodiment of a base configured to fit a plurality of gauge head configurations.

Referring to FIG. 20, it is noted that the two tabs 31a and 31b have been removed from the base 150. Since the Taylor™ Screw-In model, gauge head 18c, which is different from both gauge heads 18a and 18b, is configured to be attached with the shown fasteners 166a and 166b. In the Taylor™ Screw-In model, the fasteners are in a different position with respect to the base 150 than are the fasteners for Rochester Junior™ four-bolt model. Accordingly, to fit the base onto gauge head 18c, the tabs 31a and 31b have been removed. In removing the tabs, by snapping, cutting, or otherwise severing them from the base 150, fastener receiving ports 168a and 168b remain on the outer edge 158 and replace the tabs 31a and 31b. The fastener receiving ports 168a and 168b can then receive fasteners 166a and 166b to install the telemetric fitting on gauge head 18c, so that the base sits flush against the top of the gauge head surface.

Figure 21:
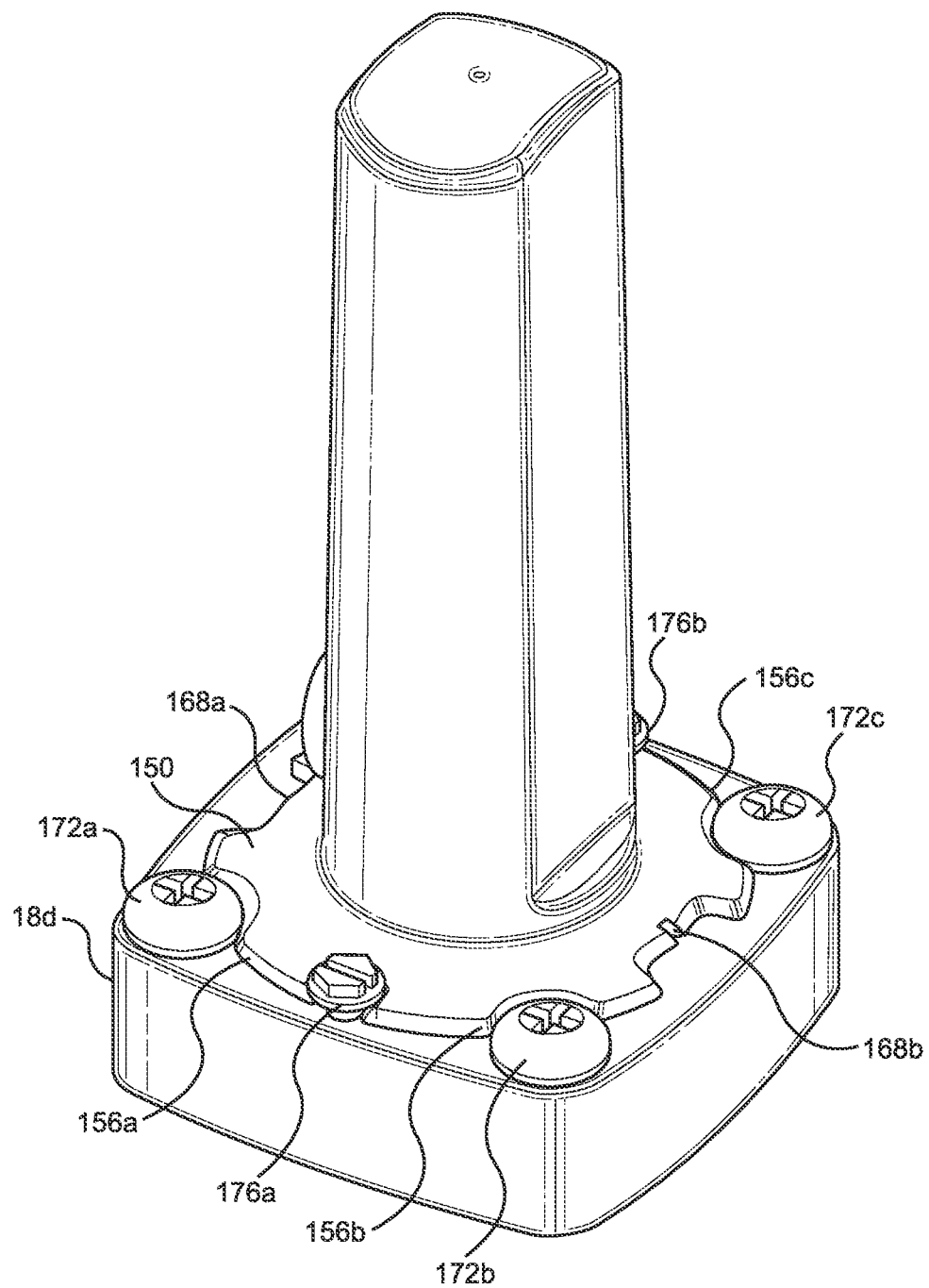
FIG. 21 depicts a perspective view of another disclosed embodiment of a base configured to fit a plurality of gauge head configurations.
Figure 22:
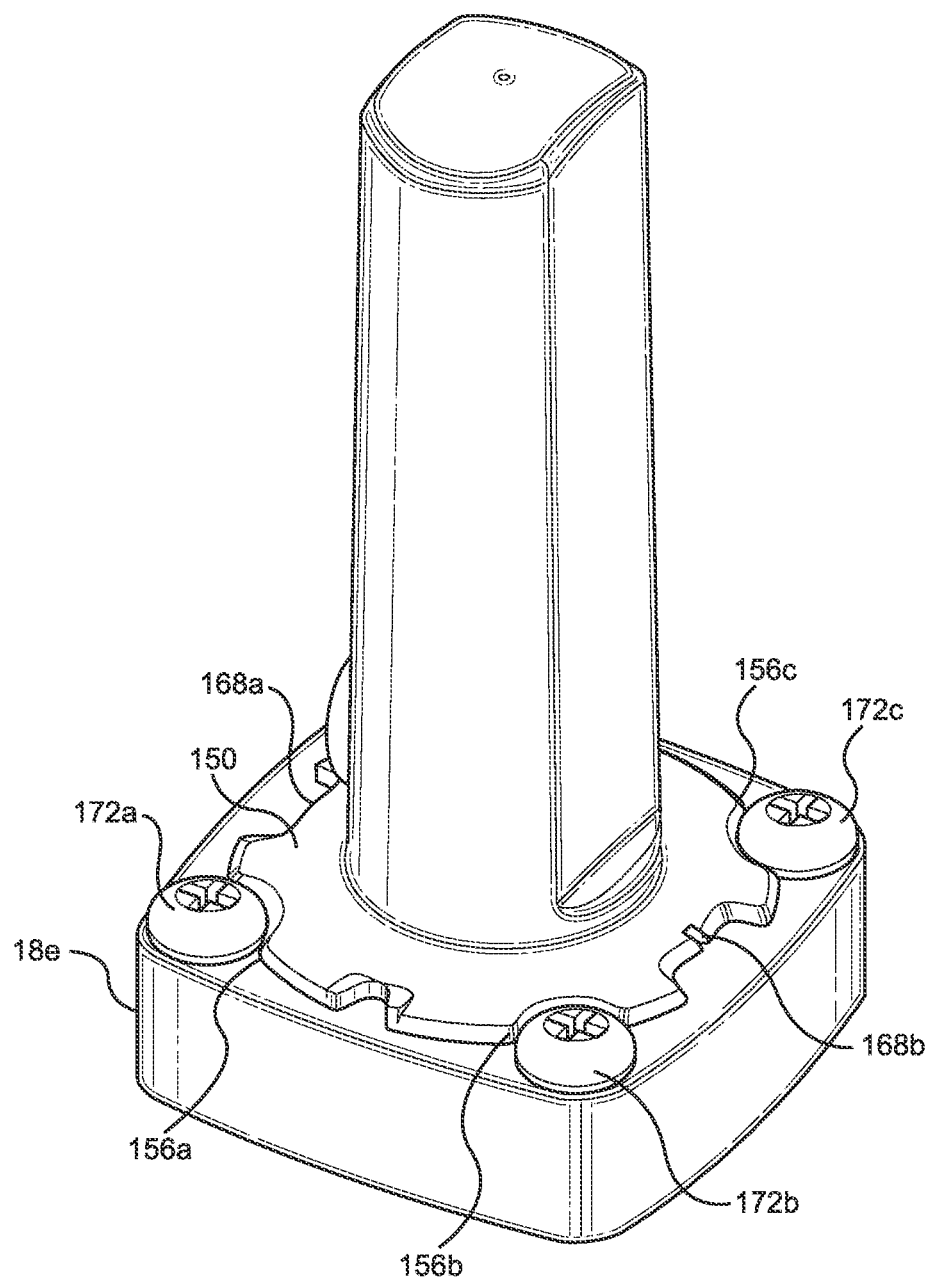
FIG. 22 depicts a perspective view of another disclosed embodiment of a base configured to fit a plurality of gauge head configurations.

Referring to FIG. 21, it is noted that the two tabs 31a and 31b have been removed from the base 150. In the embodiment shown in FIG. 21, a Taylor™ 4-Bolt model is shown which utilises fastener ports depicted as scalloped edge portions for fasteners 176a-b. In this embodiment, the two tabs 31a and 31b have been removed from the base 150, leaving fastener receiving ports 168a and 168b, and the base 150, flush against the top surface of the gauge head 18d. In the Taylor™ 4-Bolt model, the scalloped outer edge portions 156a, 156b, 156c and 156d (not shown) of the outer edge 158 of the base fit around the four bolt fastener heads 172a, 172b, 172c, and 172d (not shown) of a gauge head 18d. Referring to FIG. 22, it is noted that the two tabs 31a and 31b have been removed from the base 150. In the embodiment shown in FIG. 22, a Taylor™ Glue-Down model is shown as glued down onto the gauge head 18e. In this embodiment, the two tabs 31a and 31b have been removed from the base 150, leaving fastener receiving ports 168a and 168b, and the base 150 flush up against the gauge head 18e. In the Taylor™ 4-Bolt model, the scalloped outer edge portions 156a, 156b, 156c and 154d (not shown) of the outer edge 158 of the base 150 fit around the four bolt fastener heads 172a, 172b, 172c, and 172d (not shown) of a gauge head 18e.

Figure 23:
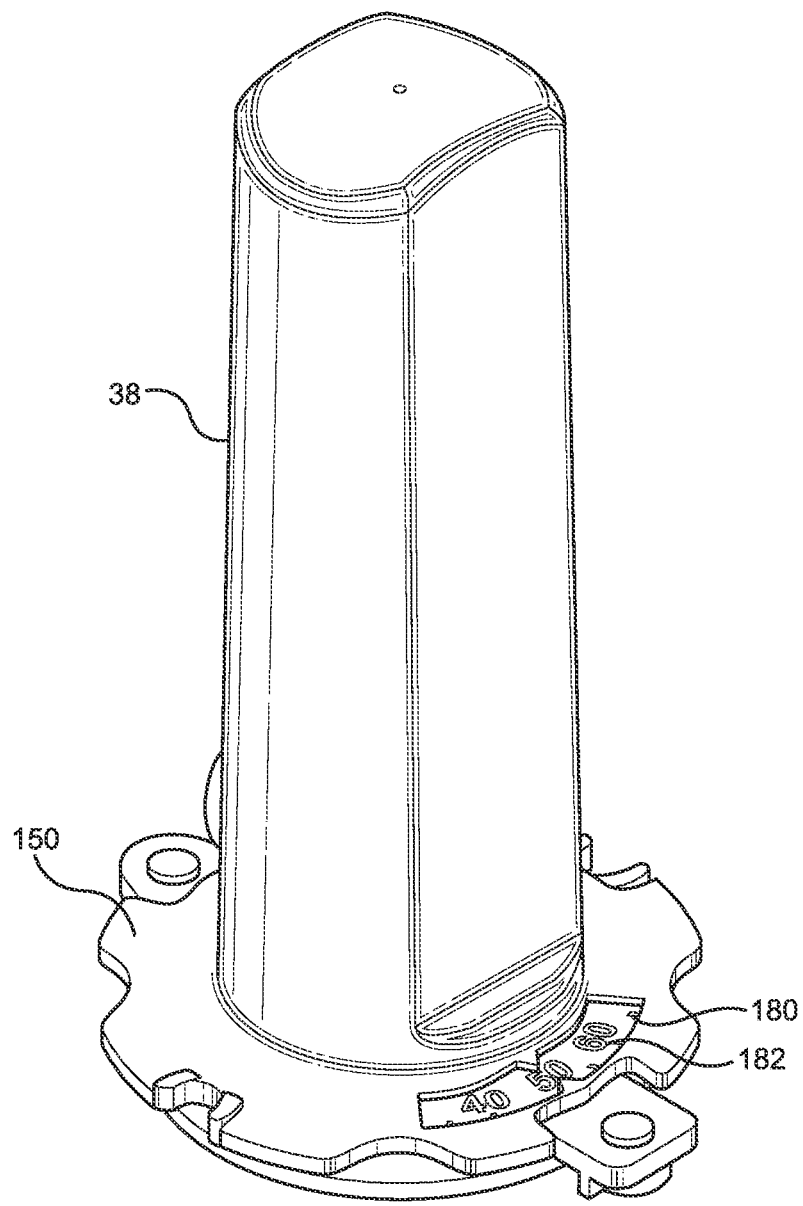
FIG. 23 depicts a perspective view of a base configured to fit a plurality of gauge head configurations, showing an indicator window.

Referring to FIG. 23, depicted is a disclosed telemetric fitting 38, which can include a housing that is tower-shaped, that is supported by the base 150. The base and the tower can be moulded as a single piece, or may be moulded as more than one piece, and then attached to one another. Also depicted on the base 150 is a human-readable indicator window 180 through which to view a human-readable indicator 182. Other housing configurations are within the scope of this discussion. It is understood that the tower can cover more of the base than is depicted. For example, a housing may be larger, such as that shown in FIG. 13. A large housing allows the device to include larger batteries, such as AA-sized batteries or a 9-Volt battery. The housing may have a different configuration as those shown herein, for example, wherein the housing of FIG. 13 includes a set-back portion along its longitudinal axis to expose a window 180 of the base 150.

Figure 24:
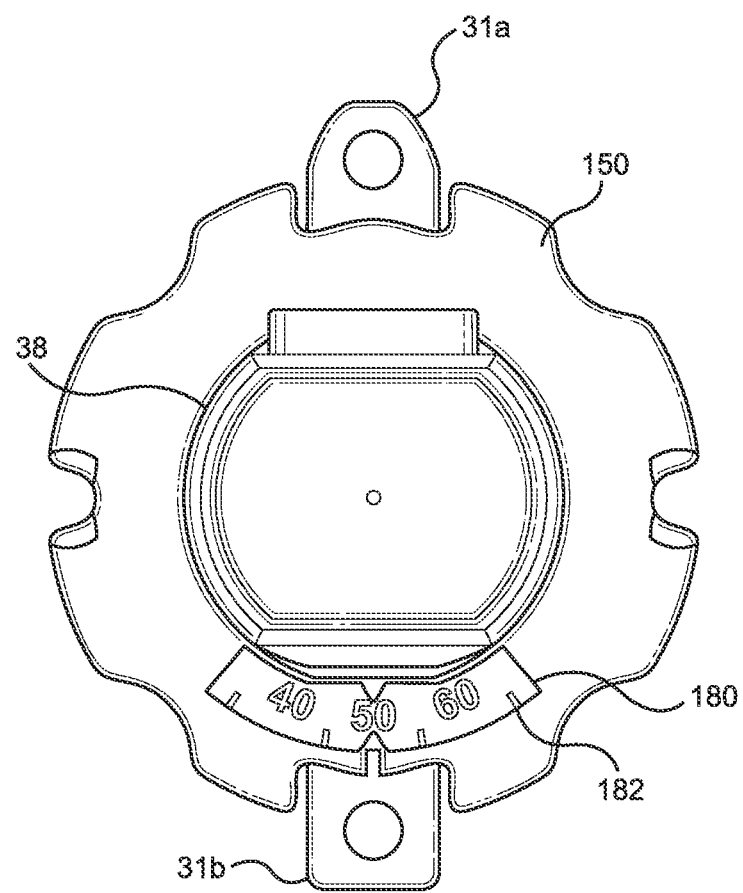
FIG. 24 depicts a downward top plan view of a base configured to fit a plurality of gauge head configurations, showing an indicator window.

Referring to FIG. 24, a downward top plan view of the base 150 is shown. In this view, it is easier to see that tabs 31a and 31b have different shapes. For the Rochester Junior™ Four-Bolt model gauge head 18a depicted in FIG. 18, the tab receiving ports 162a and 162b are configured to receive tabs 31a and 31b. As further depicted in FIG. 24, the human-readable dial 182, which is read through window 180, can be viewed easily by looking down on the base. Thus, any configuration of the housing 38 that allows viewing of the human-readable dial 182 is within the scope of this discussion.

Attachment to other compatible gauges may, for example, be made using an adaptor. The end 36 has an exterior surface configured to mate with an exterior surface of the head 18, and in this embodiment, the exterior surface of the end 36 has a centrally raised exterior surface for mating with a centrally recessed exterior surface of the head 18. The exterior surface of the end 36 is that of a closure 34 in the form of a pan that may be selected from a plurality of closures for mating with differently-configured liquid-level gauge head configurations. The at least one ferromagnetic element 42, 43 and rotary bearing assembly 45 may be disposed within the closure 34. The closure 34 may be ultrasonically welded to the other part of the exterior housing 38, which may be lined with a sleeve 46 for protecting the electronics from sunlight.

A magnetic switch 73, in the form of a Hall effect switch, is in communication with the processor 60, and can generate a logic level state change in response to the presence of a magnetic field. By approaching the telemetric fitting 30 with a magnet, the Hall effect switch 73 can change state and thus wake up the processor 60 via an interrupt. Other types of magnetic switches can be used instead of the Hall effect switch, for example, an anisotropic magnetoresistance (AMR) switch or a tunnelling magnetoresistance (TMR) switch. In an alternative embodiment, a reed switch is used instead of the Hall effect switch, although it may be more expensive and more fragile than the Hall effect switch. The device may be woken up using alternative methods, for example, using an infrared sensor and an infrared torch, or an externally accessible switch in the form of a membrane switch.

Figure 12:
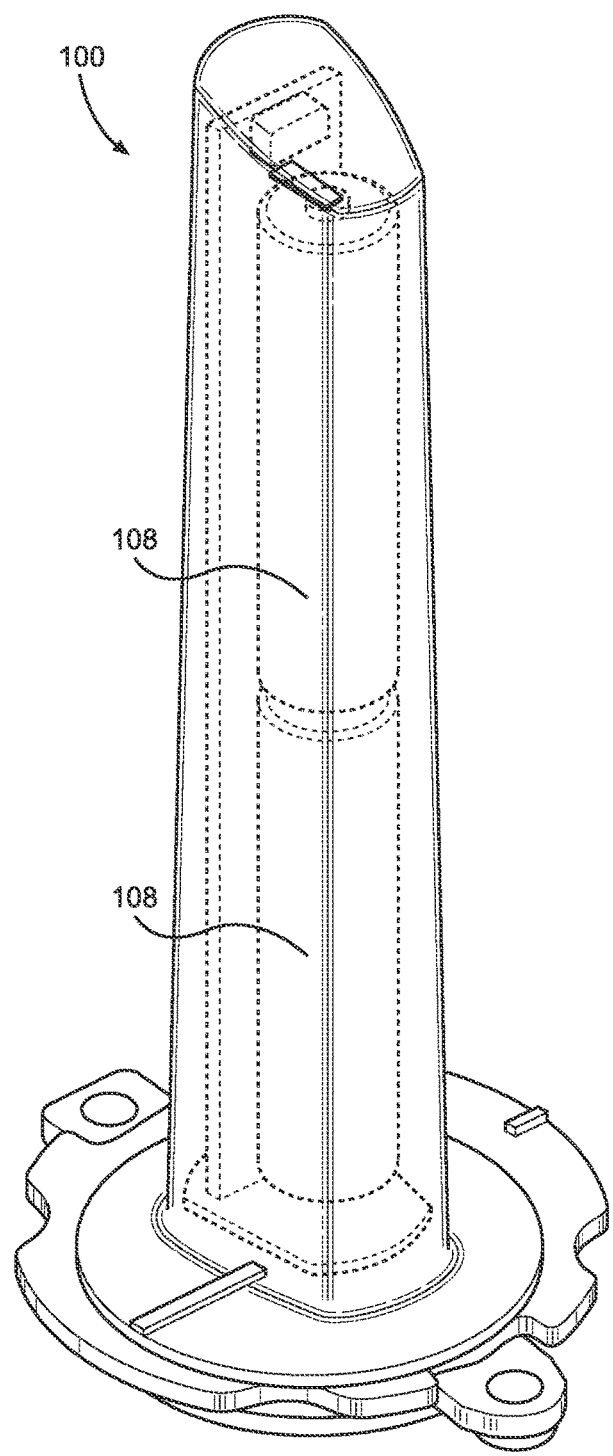
FIG. 12 shows a perspective view of an alternative embodiment of a telemetric fitting.

While the embodiment of FIG. 3 has a plurality of spatially parallel batteries 62, another embodiment of the telemetric fitting 100 shown in FIG. 12 has a plurality of serially spatially-arranged batteries 108. Other embodiments may have a single battery or more than two batteries.

Figure 15:
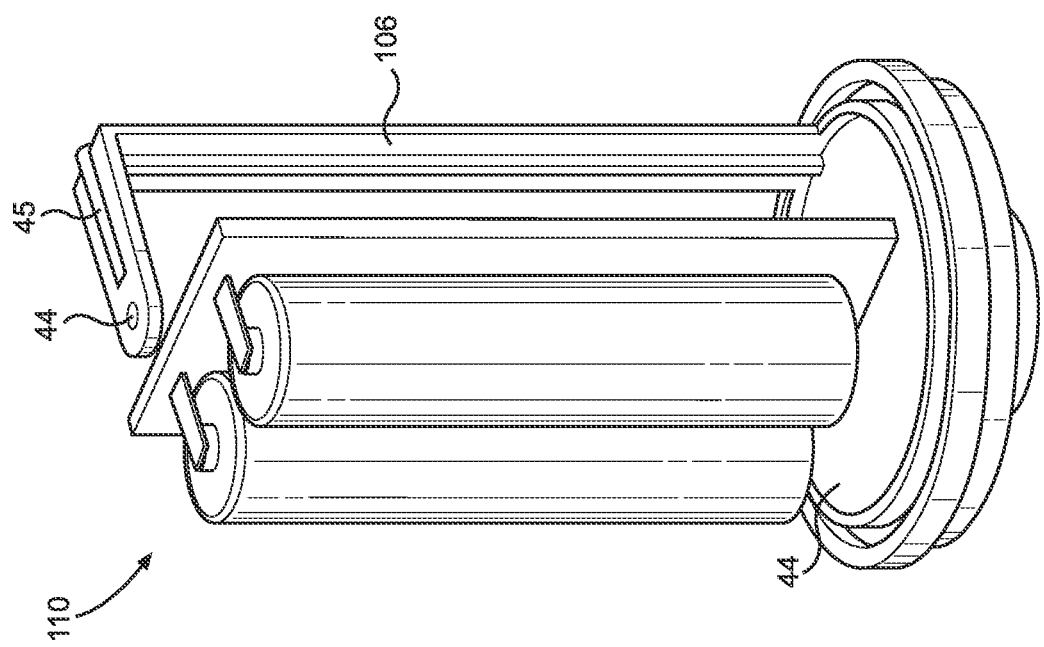
FIGS. 13-15 show various perspective views of another alternative embodiment of a telemetric fitting.
Figure 14:
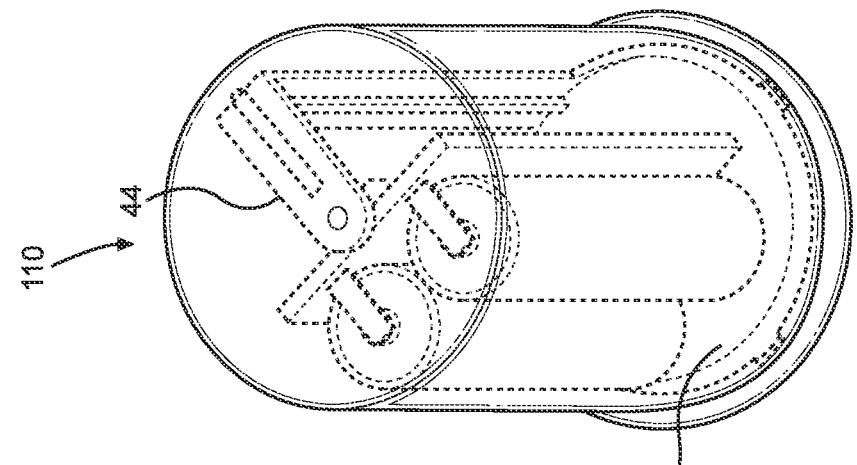
Figure 13:
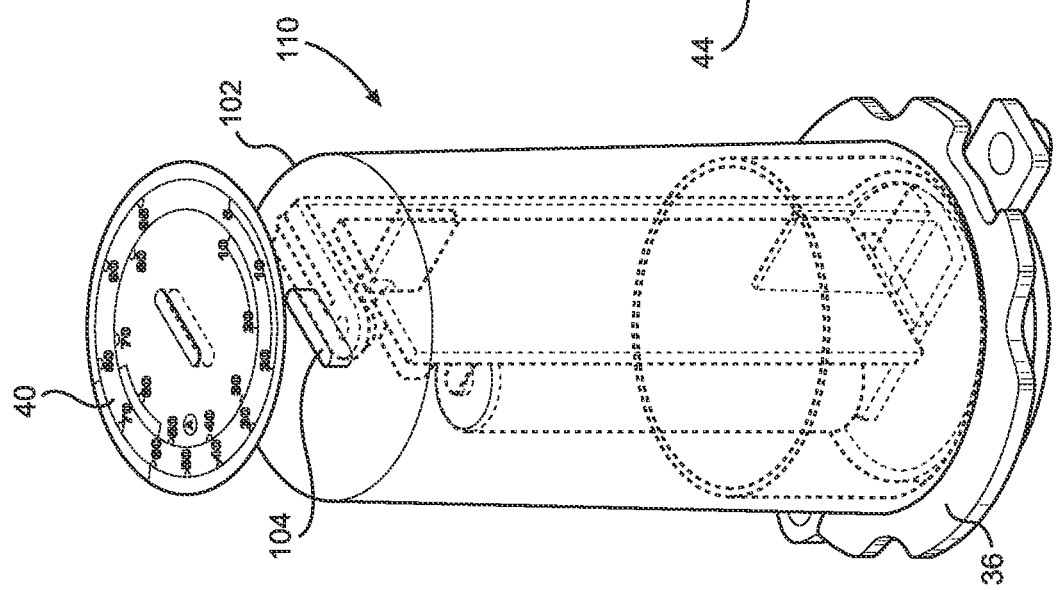

An alternative embodiment of a telemetric fitting 110 is shown in FIGS. 13-15, which has similar and/or identical form and function to the embodiment of FIG. 3 except where otherwise described or illustrated. Parts in FIGS. 13-15 having similar and/or identical form and/or function to parts in FIGS. 3-12 are similarly numbered. The telemetric fitting 110 has a dial 40 attached to an upper end 102 thereof. The dial 40 may be, for example, friction-fitted to at least one post 104, or attached thereto using adhesive or generally any suitable way. The indicator 44 is configured to have a pointer 45 thereof disposed adjacent the dial 40 at the upper end 102. An indicator 44 has a bracket 106 that extends longitudinally and is terminated by the inwardly directed pointer 45. Alternatively, the pointer may be attached at the top of a central axle in the form of a pin. The pointer and pin may be a single piece moulded part.

An embodiment of a method of telemetric measurement of the liquid level within the vessel 19 will now be described. The embodiment of the method may be performed using the telemetric fitting 30, 100, or 110. A step comprises deriving liquid-level information from a liquid-level gauge 10 attached to the vessel 19 with the telemetric fitting 30 attached to the head 18 of the liquid-level gauge. A step comprises the telemetric fitting 30 wirelessly transmitting the liquid-level information so derived.

The present embodiment but not all embodiments, of the method comprise a step of attaching the telemetric fitting 30 to the liquid-level gauge 10.

Transmitting the liquid-level information so derived may comprise transmitting the liquid-level information over a LPWAN.

Deriving the liquid-level information may comprise deriving the liquid-level information from the liquid-level gauge 10 with a gauge interface 32 of the telemetric fitting 30. The gauge interface 32 magnetically derives the liquid-level information from the liquid-level gauge 10. The gauge interface 32 may derive the liquid-level information by sensing the liquid-level dependent magnetic field, in this embodiment its orientation, generated by the liquid-level gauge 10.

An optional step comprises selecting a dial 40 of a plurality of dials for a plurality of differently-configured liquid-level gauges and attaching the dial to an exterior housing of the telemetric fitting 30.

Now that embodiments have been described, it will be appreciated that some embodiments may have some of the following advantages:

The telemetric fitting for a liquid-level gauge attached to a vessel may be a unit without requiring snag-able cabling external of the housing, and without, for example, externally exposed electrical connections that may corrode.

Accuracy of better than 2.5 degrees of pointer rotation may be achievable, equivalent to 1% of full-scale reading. Higher accuracy may translate to greater certainty about when a tank is due to be refilled, which can be a significant savings for a company that services thousands of vessels.

The liquid-level information for a liquid level in a tank may be remotely monitored and/or stored by a remote computing device. Tank refilling may be scheduled appropriately and/or automatically without requiring a manual liquid-level reading and subsequent manual communication of the liquid-level reading.

The telemetric fitting may mate with a plurality of liquid-level gauge types for different tanks, so an installer does not need to know in advance which type of float-level gauge and/or tank will be found on site, and the installer need only carry one type of telemetric fitting.

The dial is selectable, so an installer does not need to know in advance which type of float-level gauge will be found on site, and the installer need only carry one type of telemetric fitting.

The dial may be viewable from above, unobstructed by vessel vapour outlets and liquefied gas inlets, for example.

The use of a single journal bearing assembly may improve liquid-level reading accuracy.

The use of at least one ferroelectric element 42, 43 drives the indicator and has the advantage that it may produce a more consistent magnetic field, as sensed by the magnetic sensor 64.

Variations and/or modifications may be made to the embodiments described without departing from the spirit or ambit of the invention. For example, while embodiments have been described for a liquid-level gauge, alternative embodiments may be for a pressure measurement gauge generating a pressure-dependent magnetic field. Embodiments of telemetric fittings may be generally used with any suitable gauge that generates a physical-property-dependent magnetic field. The present embodiments are, therefore, to be considered in all respects as illustrative and not restrictive. Reference to a feature disclosed herein does not mean that all embodiments must include the feature.

Prior art described herein is not to be taken as an admission that the prior art forms part of the common general knowledge in any jurisdiction.

In the claims that follow, and in the preceding description of the invention, except where the context requires otherwise, due to express language or necessary implication, the word "comprise" or a variation such as "comprises" or "comprising" is used in an inclusive sense, that is to specify the presence of the stated features, but not to preclude the presence or addition of further features in various embodiments of the invention.

The invention claimed is:

1. A telemetric fitting for a usage gauge of a vessel, the usage gauge including a gauge head, the telemetric fitting comprising:
   a housing;
   a base supporting the housing, the base for attachment to the gauge head;
   wherein the base is configured for attachment to a plurality of gauge head configurations;
   wherein the base comprises at least two tabs for attaching the base to a first gauge head;
   wherein the tabs are capable of being removed to reconfigure the base for attachment to a second gauge head; and
   wherein, when the at least two tabs have been removed, the base further comprises fastener receiving ports to receive fasteners, the fastener receiving ports replacing the at least two tabs.

2. The base of the telemetric fitting of claim 1, wherein the at least two tabs are configured to align within particular tab receiving ports of a gauge head.

3. The base of telemetric fitting of claim 1, further comprising an outer edge and wherein the outer edge comprises scalloped portions for fitting the base around fastener heads of a gauge head.

4. The base of the telemetric fitting of claim 1, wherein the base has an upper surface and wherein the tabs are depressed below the upper surface.

5. The telemetric fitting of claim 1, wherein the housing is tower-shaped.

6. The telemetric fitting of claim 1, the base further comprising a window for viewing through to a human-readable indicator.

7. A telemetric fitting for a usage gauge of a vessel, the usage gauge including a gauge head, the telemetric fitting comprising:
   a housing;
   a base supporting the housing, the base for attachment to the gauge head;
   wherein the base is configured for attachment to a plurality of gauge head configurations;
   wherein the base comprises:
      scalloped outer edge portions; and
      wherein the scalloped outer edge portions are for fitting the base around fastener heads of the gauge head.

8. The base of the telemetric fitting of claim 7, further comprising, at least two tabs which are configured to align within particular tab receiving ports of the gauge head.

9. The base of the telemetric fitting of claim 7, further comprising at least two tabs which are capable of being removed to reconfigure the base for fitting to the gauge head.

10. The base of the telemetric fitting of claim 9, wherein when the at least two tabs have been removed, the base further comprising fastener receiving ports to receive fasteners, the fastener receiving ports replacing the at least two tabs.

11. The base of the telemetric fitting of claim 9, wherein the base has an upper surface and wherein the tabs are depressed below the upper surface.

12. The telemetric fitting of claim 7, wherein the housing is tower-shaped.

13. The telemetric fitting of claim 7, wherein the base further comprises a window for viewing through to a human-readable indicator.

14. A telemetric fitting for a usage gauge of a vessel, the usage gauge including a gauge head, the telemetric fitting comprising:
   a housing;
   a base supporting the housing, the base for attachment to the gauge head;
   wherein the base is configured for attachment to a plurality of gauge head configurations;

wherein the base comprises:
- an outer edge; and
- at least two tabs for fitting to a first gauge head;
- wherein the tabs are capable of being removed; and
- wherein fastener receiving ports remain on the outer edge replacing the tabs when the tabs have been removed.

15. The base of the telemetric fitting of claim 14, wherein the at least two tabs are configured to fit within particular tab receiving ports of the gauge head.

16. The base of telemetric fitting of claim 14, wherein the outer edge comprises scalloped portions for fitting around a plurality of fastener heads of the gauge head.

17. The base of the telemetric fitting of claim 14, wherein the base has an upper surface and wherein the tabs are depressed below the upper surface.

18. The telemetric fitting of claim 14, wherein the housing is tower-shaped.

19. The telemetric fitting of claim 14, wherein the base further comprises a window for viewing through to a human-readable indicator.

* * * * *